(12) United States Patent
Fujita

(10) Patent No.: US 12,482,072 B2
(45) Date of Patent: Nov. 25, 2025

(54) IMAGE PROCESSING APPARATUS, IMAGE PROCESSING METHOD, AND PROGRAM

(71) Applicant: FUJIFILM Corporation, Tokyo (JP)

(72) Inventor: Jo Fujita, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 225 days.

(21) Appl. No.: 18/460,714

(22) Filed: Sep. 5, 2023

(65) Prior Publication Data

US 2023/0410270 A1    Dec. 21, 2023

Related U.S. Application Data

(63) Continuation of application No. PCT/JP2022/004602, filed on Feb. 7, 2022.

(30) Foreign Application Priority Data

Mar. 29, 2021 (JP) .................. 2021-056180

(51) Int. Cl.
*G06T 5/50* (2006.01)
*G06V 10/764* (2022.01)

(52) U.S. Cl.
CPC .............. *G06T 5/50* (2013.01); *G06V 10/764* (2022.01); *G06T 2207/20221* (2013.01)

(58) Field of Classification Search
CPC ................ G06V 10/764; G06T 5/50; G06T 2207/20221; G06T 2207/10088; G01R 33/56341; G01R 33/56383; A61B 5/055
See application file for complete search history.

(56) References Cited

U.S. PATENT DOCUMENTS

| 2008/0007264 A1 | 1/2008 | Ichinose |
| 2010/0081918 A1 | 4/2010 | Sugiura et al. |
| 2014/0212017 A1 | 7/2014 | Sugiura et al. |

(Continued)

FOREIGN PATENT DOCUMENTS

| JP | 2008012172 | 1/2008 |
| JP | 2013255854 | 12/2013 |
| JP | 2015517375 | 6/2015 |

(Continued)

OTHER PUBLICATIONS

Dow-Mu et al. "Diffusion-Weighted MRI in the Body: Applications and Challenges in Oncology", First Published in Nov. 23, 2012, American Roentgen Ray Society, American Journal of Roentgenology vol. 188, Issue 6, pp. 1439-1723 . . . https://doi.org/10.2214/AJR.06.1403 (Year: 2012).*

(Continued)

*Primary Examiner* — Kee M Tung
*Assistant Examiner* — Thang Gia Huynh
(74) *Attorney, Agent, or Firm* — JCIPRNET

(57) ABSTRACT

The image processing apparatus includes a processor. The processor is configured to acquire diffusion-weighted images of a plurality of sites; derive an ADC value of each of the sites from the diffusion-weighted images of the plurality of sites; combine the diffusion-weighted images of the plurality of sites to generate a composite diffusion-weighted image; combine the respective ADC values of the sites to generate an ADC image; and combine the composite diffusion-weighted image and the ADC image to generate a composite image.

12 Claims, 16 Drawing Sheets

(56) References Cited

U.S. PATENT DOCUMENTS

2015/0108976 A1   4/2015  Fischer et al.
2017/0067978 A1   3/2017  Le Bihan et al.

FOREIGN PATENT DOCUMENTS

| JP | 2015167610 | 9/2015 |
| JP | 2016000102 | 1/2016 |
| JP | 2019037465 | 3/2019 |
| JP | 2019180937 | 10/2019 |
| JP | 2020137889 | 9/2020 |

OTHER PUBLICATIONS

Takahara Taro, "Concepts and utility of DWIBS method", Japanese Journal of Urological Surgery, 2019, submit with Machine English translation, pp. 1-22.

Radhia Ferjaoui et al., "Lymphoma Lesions Detection from Whole Body Diffusion-Weighted Magnetic Resonance Images", 2018 5th International Conference on Control, Decision and Information Technologies (CoDIT'18), Apr. 2018, pp. 364-369.

"International Search Report (Form PCT/ISA/210) of PCT/JP2022/004602," mailed on Mar. 22, 2022, with English translation thereof, pp. 1-7.

"Written Opinion of the International Searching Authority (Form PCT/ISA/237) of PCT/JP2022/004602," mailed on Mar. 22, 2022, with English translation thereof, pp. 1-6.

\* cited by examiner

IMAGE PROCESSING APPARATUS, IMAGE PROCESSING METHOD, AND PROGRAM

CROSS-REFERENCE TO RELATED APPLICATIONS

This application is a continuation application of International Application No. PCT/JP2022/004602 filed Feb. 7, 2022, the disclosure of which is incorporated herein by reference in its entirety. Further, this application claims priority under 35 USC 119 from Japanese Patent Application No. 2021-056180 Mar. 29, 2021, the disclosure of which is incorporated by reference herein.

BACKGROUND

1. Technical Field

The technology of the present disclosure relates to an image processing apparatus, an image processing method, and a program.

2. Related Art

JP2015-167610A discloses an image processing apparatus. The image processing apparatus includes a receiving unit, a parameter acquisition unit, a diagnostic image composition unit, and an output unit. The receiving unit receives a diffusion-weighted image. The parameter acquisition unit acquires two or more types of parameters for each of one or more units of processing constituting the diffusion-weighted image. The diagnostic image composition unit acquires, for each of the one or more units of processing, scores for the two or more types of parameters and composes a diagnostic image. The diagnostic image is an image having, for each of the one or more units of processing, a pixel value corresponding to a score. The output unit outputs the diagnostic image.

JP2008-012172A discloses a magnetic resonance imaging apparatus. The magnetic resonance imaging apparatus includes means for generating a diffusion-weighted image on the basis of a magnetic resonance signal radiated from a photographic subject, and reading image generation means for generating an image to be read. The image to be read is an image in which a region having a diffusion coefficient less than a threshold value in the diffusion-weighted image is highlighted more than other regions.

JP2013-255854A discloses a magnetic resonance diagnostic apparatus. The magnetic resonance diagnostic apparatus includes imaging means, derivation means, and estimation means. The imaging means captures at least two original images by using at least two b-values, respectively. The b-values are values indicating intensities of a gradient magnetic field during imaging performed with an MM device, and is determined in association with a site of a photographic subject included in an imaging region. The derivation means derives, for each of pixel positions included in a region of interest in the at least two original images, an apparent diffusion coefficient related to the pixel position on the basis of a respective one of pixel values in the at least two original images. The estimation means estimates a pixel value obtained by using a b-value different from the at least two b-values on the basis of the apparent diffusion coefficient. In addition, the at least two b-values are determined in advance in accordance with a plurality of sites to estimate pixel values.

JP2020-137889A discloses a projection image arithmetic processing apparatus. The projection image arithmetic processing apparatus includes memory means, projection arithmetic processing means, and monitor means. The memory means stores at least two types of medical image data obtained by imaging a subject. The projection arithmetic processing means reads out the at least two types of medical image data stored in the memory means and performs projection arithmetic processing on the medical image data to project and display a medical image. The monitor means projects and displays a medical image by using the medical image data on which the projection arithmetic processing is performed by the projection arithmetic processing means. The projection arithmetic processing means includes a region identification unit, a coordinate identification unit, and a projection arithmetic processing unit. The region identification unit identifies a rendering region from first medical image data constituting a first medical image among the at least two types of medical image data. The coordinate identification unit identifies, in second medical image data constituting a second medical image different from the first medical image among the at least two types of medical image data, a pixel having the same coordinates as those of each pixel in the rendering region identified in the first medical image data. The projection arithmetic processing unit performs projection and display, for each pixel in the rendering region, on the first medical image projected and displayed on the monitor means on the basis of a signal value of a pixel in the second medical image. In the projection image arithmetic processing apparatus described in JP2020-137889A, the first medical image is a diffusion-weighted image, and the second medical image is an ADC (Apparent Diffusion Coefficient) image.

JP2016-000102A discloses an image processing apparatus. The image processing apparatus includes an image acquisition unit, a setting unit, an image derivation unit, and a display unit. The image acquisition unit acquires a first diffusion-weighted image captured by using a first b-value. The setting unit sets a second b-value and a first cutoff diffusion coefficient having a value greater than or equal to 0. The image derivation unit derives a virtual diffusion-weighted image at the second b-value for a pixel for which a diffusion coefficient corresponding to a pixel in the first diffusion-weighted image is larger than the first cutoff diffusion coefficient, on the basis of the diffusion coefficient and the first diffusion-weighted image. The display unit displays the virtual diffusion-weighted image.

SUMMARY

An embodiment according to the technology of the present disclosure provides an image processing apparatus, an image processing method, and a program that can obtain a more accurate composite image than a composite image based on an ADC value derived from an image obtained by combining diffusion-weighted images of a plurality of sites.

An image processing apparatus according to a first aspect of the present disclosure includes a processor. The processor is configured to acquire a site diffusion-weighted image for each of a plurality of sites; derive an ADC value of each of the sites from a plurality of the site diffusion-weighted images; combine the plurality of site diffusion-weighted images to generate a composite diffusion-weighted image; combine the respective ADC values of the sites to generate an ADC image; and combine the composite diffusion-weighted image and the ADC image to generate a composite image.

An image processing method according to a second aspect of the present disclosure includes acquiring a site diffusion-weighted image for each of a plurality of sites; deriving an ADC value of each of the sites from a plurality of the site diffusion-weighted images; combining the respective ADC values of the sites to generate an ADC image; combining the plurality of site diffusion-weighted images to generate a composite diffusion-weighted image; and combining the composite diffusion-weighted image and the ADC image to generate a composite image.

A program according to a third aspect of the present disclosure causes a computer to execute a process including acquiring a site diffusion-weighted image for each of a plurality of sites; deriving an ADC value of each of the sites from a plurality of the site diffusion-weighted images; combining the respective ADC values of the sites to generate an ADC image; combining the plurality of site diffusion-weighted images to generate a composite diffusion-weighted image; and combining the composite diffusion-weighted image and the ADC image to generate a composite image.

BRIEF DESCRIPTION OF THE DRAWINGS

Exemplary embodiments of the technology of the disclosure will be described in detail based on the following figures, wherein.

DETAILED DESCRIPTION

An example of an embodiment of a medical operation support apparatus 10 using an image processing apparatus, an image processing method, and a program according to the technology of the present disclosure will be described with reference to the accompanying drawings.

1. Overall Configuration

Figure 1:
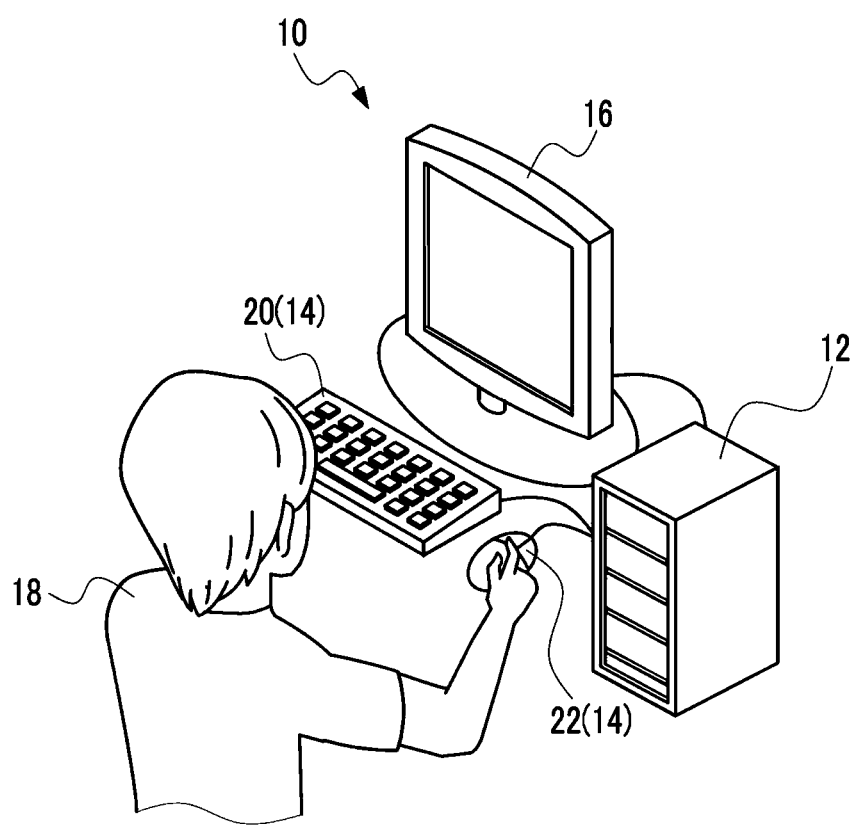
FIG. 1 is a conceptual diagram illustrating a schematic configuration of a medical operation support apparatus.
Figure 2:
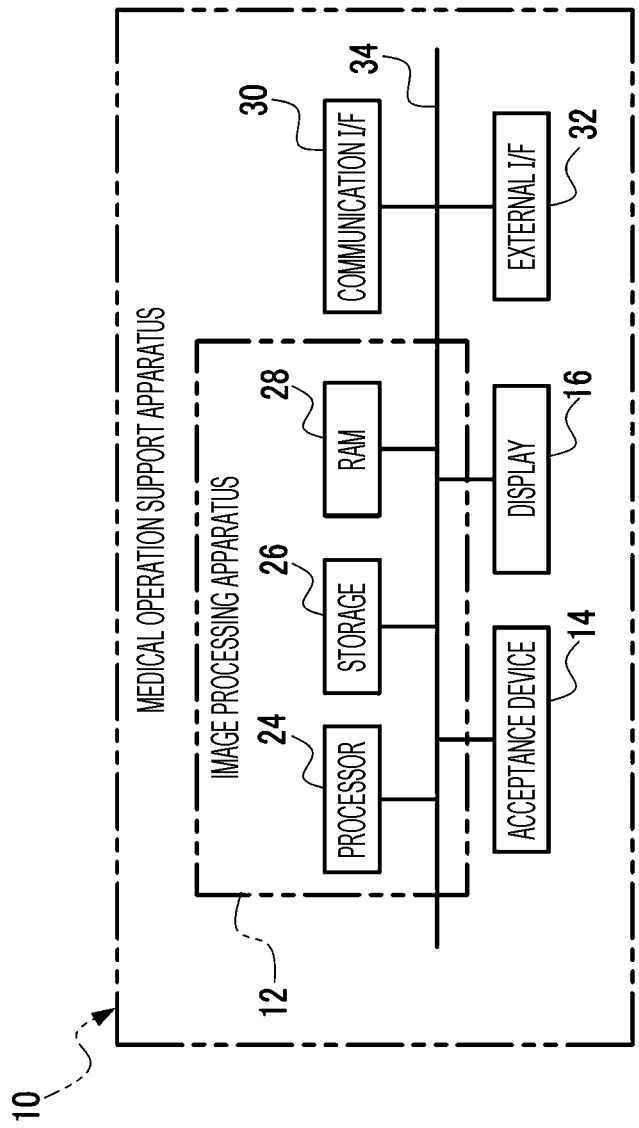
FIG. 2 is a block diagram illustrating an example hardware configuration of an electric system of the medical operation support apparatus.

As illustrated in FIG. 1, the medical operation support apparatus 10 includes an image processing apparatus 12, an acceptance device 14, and a display 16, and is used by a user 18. Examples of the user 18 include a doctor and an engineer. As illustrated in FIG. 2, the medical operation support apparatus 10 further includes a communication OF (Interface) 30, an external OF 32, and a bus 34.

2. Configuration of Components 2-1. Acceptance Device

The acceptance device 14 has a keyboard 20, a mouse 22, and the like, and accepts an instruction from the user 18. While FIG. 1 illustrates the keyboard 20 and the mouse 22 as examples of the acceptance device 14, other examples may be employed. For example, the acceptance device 14 may be implemented as a touch panel, a tablet, and/or the like, in place of the keyboard 20 and/or the mouse 22 or along with the keyboard 20 and/or the mouse 22. The touch panel and the tablet accept proximity input. Alternatively, at least one of the keyboard 20, the mouse 22, a touch panel, a tablet, an audio input device, an image capturing device, or a sensor may be used as the acceptance device 14. The audio input device accepts audio input. The image capturing device accepts gesture input.

The acceptance device 14 is connected to the image processing apparatus 12. The acceptance device 14 may be connected to the image processing apparatus 12 in a wired or wireless way.

2-2. Display

The display 16 displays various kinds of information (for example, an image, text, and the like) under the control of the image processing apparatus 12. The display 16 is, for example, an EL (Electro-Luminescence) display, a liquid crystal display, or the like. The display 16 is also connected to the image processing apparatus 12.

2-3. Communication I/F

The communication OF 30 is connected to a network. The network may be constituted by, for example, at least one of a LAN (Local Area Network), a WAN (Wide Area Network), or the like. An external device (not illustrated) or the like is connected to the network, and the communication I/F 30 manages exchange of information with an external communication device via the network. The external communication device may include, for example, at least one of an MRI (Magnetic Resonance Imaging) device, a personal computer, a smart device, or the like. For example, the communication I/F 30 transmits information to the external communication device via the network in accordance with a request from a processor 24 described below. Further, the communication I/F 30 receives information transmitted from the external communication device and outputs the received information to the processor 24 via the bus 34 described below.

2-4. External I/F

The external I/F 32 manages transmission and reception of various kinds of information between the medical operation support apparatus 10 and an external device (not illustrated). The external device may be, for example, at least one of a smart device, a personal computer, a server, a USB (Universal Serial Bus) memory, a memory card, a printer, or the like. Examples of the external I/F 32 include a USB interface. The USB interface is directly or indirectly connected to an external device.

2-5. Bus

The bus 34 is a dedicated communication path for exchanging data, control information, and the like within the medical operation support apparatus 10. The communication I/F 30, the external I/F 32, and the processor 24, a storage 26, and a RAM 28 of the image processing apparatus 12 described below are connected to the bus 34.

2-6. Image Processing Apparatus

The image processing apparatus 12 is an example of a "computer" according to the technology of the present disclosure. The image processing apparatus 12 includes the processor 24, the storage 26, and the RAM (Random access memory) 28.

Figure 3:
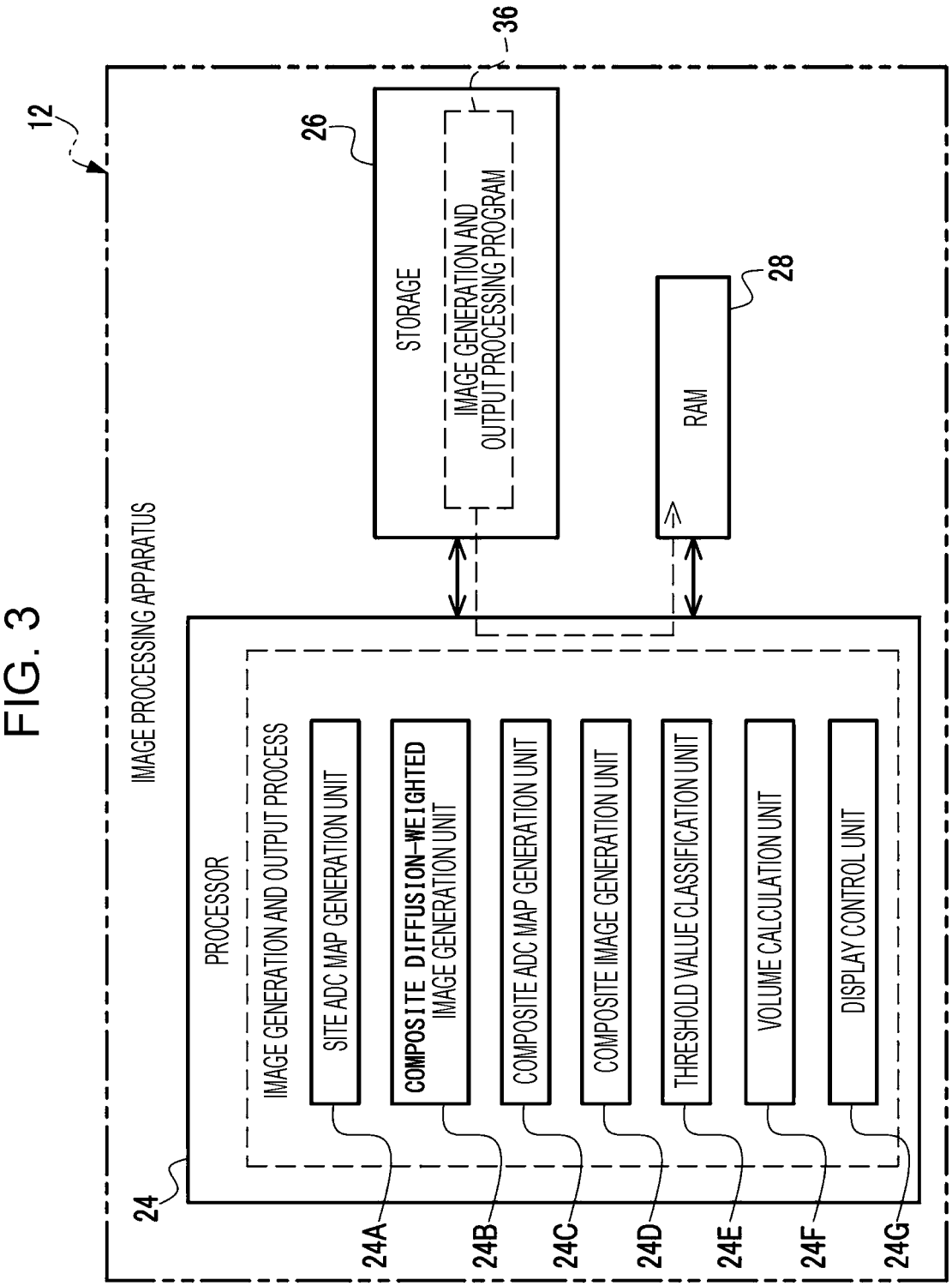
FIG. 3 is a block diagram illustrating an example of main functions of an image processing apparatus included in the medical operation support apparatus.

The processor 24 has, for example, a CPU (Central Processing Unit) and a GPU (Graphics Processing Unit). The GPU operates under the control of the CPU and is responsible for executing image-related processing. The image-related processing includes, for example, an image generation and output process (see FIG. 3 and FIG. 11) described below.

The processor 24 is connected to a memory. The memory includes the storage 26 and the RAM 28. The storage 26 is a non-volatile storage device that stores various programs, various parameters, and the like. Examples of the storage 26 include an HDD (Hard Disk Drive) and an SSD (Solid State Drive). The storage 26 is not limited to an HDD and an SSD. At least one of an HDD, an SSD, a flash memory, a magnetoresistive memory, or a ferroelectric memory may be used as the storage 26.

The RAM 28 is a memory that temporarily stores information and is used as a work memory by the processor 24. Examples of the RAM 28 include a DRAM (Dynamic Random Access Memory) and an SRAM (Static Random Access Memory).

A method using PET-CT (Positron Emission Tomography-Computed Tomography) is known as a typical method for evaluating the distribution of tumors in the whole body of a person who is a subject. By contrast, the DWIBS (Diffusion weighted whole body imaging with background body signal suppression) method has been widely used in recent years as a new method for evaluating the distribution of tumors in the whole body.

The DWIBS method is a method focusing on the higher cell density of diseased tissue such as a malignant tumor (hereinafter also referred to as a "lesion") than the cell density of normal tissue and directed to detecting a lesion on the basis of the intercellular mobility of water molecules. The DWIBS method evaluates the state of tissue by using an ADC map. The ADC map is an image of ADC (Apparent Diffusion Coefficient) values. The ADC values in the whole body are calculated from a diffusion-weighted image of the whole body. The diffusion-weighted image of the whole body is obtained by imaging with an MM device. The diffusion-weighted image is an image in which degrees of random motion (for example, Brownian motion) of microscopic water molecules are indicated by signal values.

The signal values in the diffusion-weighted image decrease as the degrees of motion of water molecules increase. In the diffusion-weighted image, a signal value indicating a lesion is higher than a signal value for normal tissue. However, a high signal value equivalent to a signal value indicating a lesion is also obtained due to restriction to the random motion of water molecules, that is, diffusion restriction. For this reason, the DWIBS method involves using an ADC map to distinguish between a signal value indicating a lesion and a signal value caused by diffusion restriction. The ADC map is an image indicating ADC values calculated for each pixel from a plurality of diffusion-weighted images. The plurality of diffusion-weighted images are obtained by the MRI device applying respective gradient magnetic fields having different intensities. The ADC values are each calculated in accordance with Formula (1) below.

$$\text{ADC value} = \ln(S1/S2)/(b2-b1) \tag{1}$$

In Formula (1), b1 and b2 are b-values. The b-values are values indicating intensities of a gradient magnetic field during imaging performed with the MM device. Note that b2 is a b-value larger than b1. S1 is a signal value obtained when a b1 gradient magnetic field is applied. S2 is a signal value obtained when a b2 gradient magnetic field is applied.

As described above, the DWIBS method makes it possible to evaluate the distribution of lesions in the whole body on the basis of an ADC map that uses ADC values calculated from diffusion-weighted images. It is therefore said that the DWIBS method will be used, instead of PET-CT, as a typical method for evaluating the distribution of lesions in the whole body in the future. This is because while both PET-CT and the DWIBS method can evaluate the distribution of lesions in the whole body, the DWIBS method has many advantages over PET-CT, such as "short imaging time", "no exposure", "no dietary restrictions", and "no injection of test drugs".

In the DWIBS method known to date, first, an MRI device captures images of a plurality of sites such as the breast, the abdomen, and the waist. Further, one whole-body diffusion-weighted image is generated from respective diffusion-weighted images obtained for the plurality of sites. That is, a plurality of site diffusion-weighted images are combined to generate a whole-body diffusion-weighted image including a plurality of sites. The sites are predetermined portions of a photographic subject. In the present embodiment, one site is adjacent to another site. That is, the plurality of sites are continuous portions and constitute a predetermined region of the photographic subject. The diffusion-weighted images of the plurality of sites are also referred to as diffusion-weighted images of a plurality of phases. In an existing method, ADC values are calculated from a whole-body diffusion-weighted image. The display 16 displays a superimposition image obtained by superimposing the whole-body diffusion-weighted image and an ADC map based on the calculated ADC values. At this time, the ADC values are classified by using at least one threshold value to visualize a position and signal value of a lesion.

However, if a plurality of site diffusion-weighted images are combined to generate a whole-body diffusion-weighted image and then ADC values are calculated from the whole-body diffusion-weighted image, correct ADC values are not obtained due to the influence of signal value conversion caused by the combining of the plurality of site diffusion-weighted images.

The causes on the modality side include, for example, a difference in contrast between sites in diffusion-weighted images obtained by an MRI device capturing images of a plurality of sites. Specifically, it is possible to image a specific organ (for example, the heart) in both cases where only the specific organ is imaged by the MRI device and where a region including the specific organ and its neighboring organs (for example, the lungs) is imaged by the MRI device. In the latter case, however, a signal value of the specific organ is affected by signal values of the neighboring organs of the specific organ. When a plurality of diffusion-weighted images obtained in the way described above are combined and joined together, joints (that is, boundary portions between the plurality of diffusion-weighted images) may look unnatural. For example, an image region indicating the heart is present in a boundary region between a diffusion-weighted image related to the breast (breast diffusion-weighted image) and a diffusion-weighted image related to the abdomen (abdomen diffusion-weighted image). In this case, an image region indicating heart tissue is present in both the breast diffusion-weighted image and the abdomen diffusion-weighted image. Nevertheless, the signal values in the vicinity of the boundary between the breast diffusion-weighted image and the abdomen diffusion-weighted image are different, and the optimum contrasts are also different. Smoothing the image of the boundary region between the plurality of site diffusion-weighted images involves adjusting the contrasts between the plurality of site diffusion-weighted images. The process of combining the plurality of site diffusion-weighted images while adjusting the contrasts involves signal value conversion (such as normalization of WW/WL, for example). Another possible cause of an unnatural image of the boundary region between the plurality of site diffusion-weighted images is that a coil used for imaging is different depending on the site.

Accordingly, to avoid an unnatural image of a boundary region between a plurality of site diffusion-weighted images, signal value conversion is performed when the plurality of site diffusion-weighted images are to be combined with the contrasts adjusted. That is, when site diffusion-weighted images of the same target with different signal values are to be combined for each site, signal value conversion is performed to match the contrasts in the site diffusion-weighted image for each site.

However, the conversion of the signal values between sites through combining of the plurality of site diffusion-weighted images results in incorrect ADC values due to the influence of the conversion of the signal values, making it difficult to correctly evaluate the distribution of tumors in the whole body.

In view of such circumstances, in the present embodiment, as an example, the processor 24 performs an image generation and output process described below (see FIG. 11). The image generation and output process is a process for generating and outputting a composite image 52 described below. The image generation and output process is performed by using an image generation and output processing program. The image generation and output processing program is stored in the storage 26. The processor 24 reads out an image generation and output processing program 36 from the storage 26 and executes the read-out image generation and output processing program 36 on the RAM 28 to perform the image generation and output process. The image generation and output process is implemented by the processor 24 operating as a site ADC map generation unit 24A, a composite diffusion-weighted image generation unit 24B, a composite ADC map generation unit 24C, a composite image generation unit 24D, a threshold value classification unit 24E, a volume calculation unit 24F, and a display control unit 24G in accordance with the image generation and output processing program 36.

Figure 4:
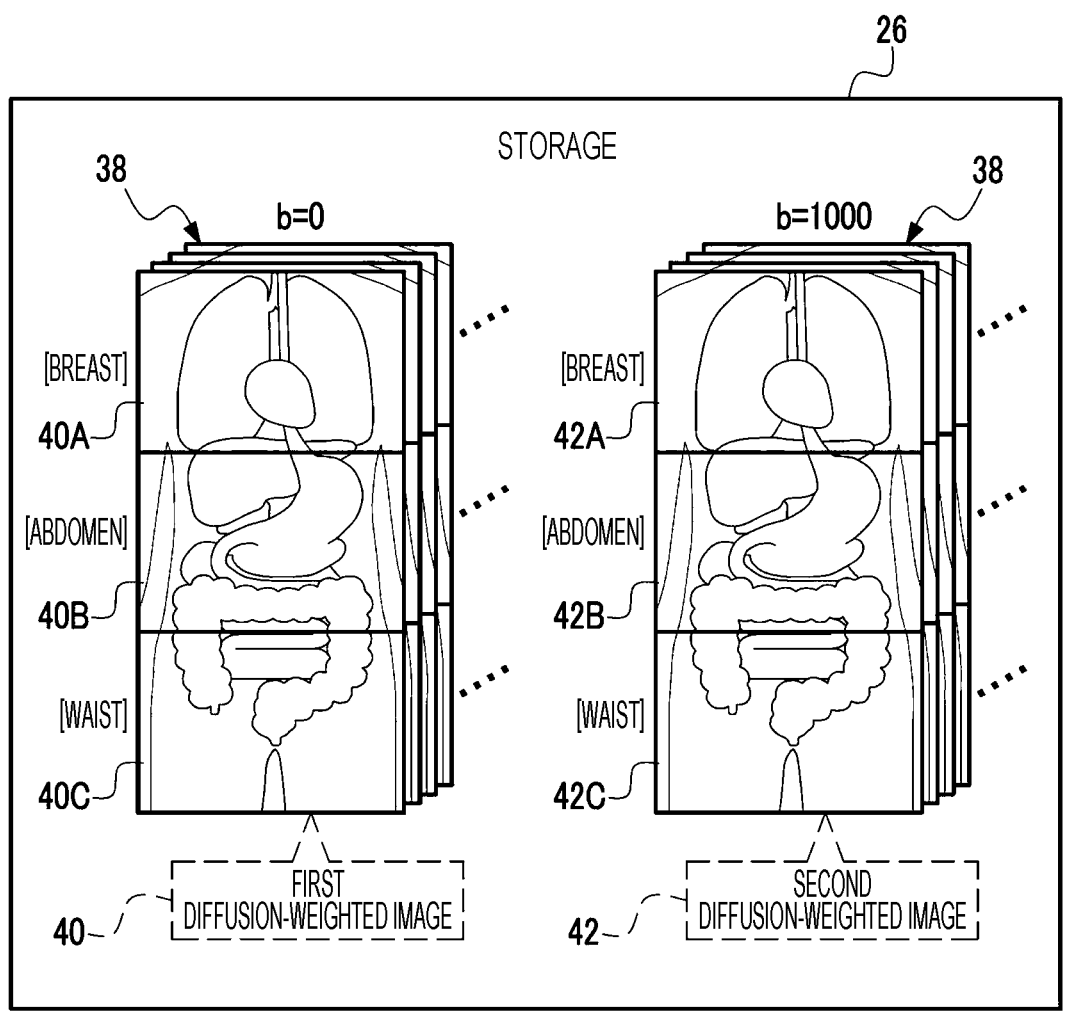
FIG. 4 is a conceptual diagram illustrating an example of content stored in a storage included in the image processing apparatus.

As an example, as illustrated in FIG. 4, the storage 26 stores diffusion-weighted images 38 of a plurality of sites in units of series. The diffusion-weighted images 38 are obtained by imaging of a human body to be imaged for each of b-values for which the gradient magnetic fields during imaging performed with the MRI device are changed. In the example illustrated in FIG. 4, the intensities of the gradient magnetic field are b-value=0 and b-value=1000. A series refers to a set of diffusion-weighted images of a plurality of frames obtained by imaging of a plurality of sites of a person to be imaged under the same imaging conditions at a predetermined frame rate (for example, 30 frames/second), with the position and attitude of the person to be imaged being maintained. In the example illustrated in FIG. 4, the plurality of sites include three phases, namely, a breast phase, an abdomen phase, and a waist phase.

The example illustrated in FIG. 4 presents a manner in which a first diffusion-weighted image (first site diffusion-weighted image) 40 and a second diffusion-weighted image (second site diffusion-weighted image) 42 are stored in the storage 26 as the diffusion-weighted images 38 of the sites included in the photographic subject. The first diffusion-weighted image 40 and the second diffusion-weighted image 42 have different intensities of a gradient magnetic field during imaging performed with the MRI device. Specifically, the first diffusion-weighted image 40 is a diffusion-weighted image 38 with b=0. The second diffusion-weighted image 42 is a diffusion-weighted image 38 with b=1000. That is, the first diffusion-weighted image 40 and the second diffusion-weighted image 42 are a plurality of intensity-based site diffusion-weighted images.

The first diffusion-weighted image 40 is classified into a plurality of sites. In the example illustrated in FIG. 4, the first diffusion-weighted image 40 is classified into a breast diffusion-weighted image 40A indicating the breast with b=0, an abdomen diffusion-weighted image 40B indicating the abdomen with b=0, and a waist diffusion-weighted image indicating the waist with b=0. The second diffusion-weighted image 42 is also classified into a plurality of sites. In the example illustrated in FIG. 4, the second diffusion-weighted image 42 is classified into a breast diffusion-weighted image 42A indicating the breast with b=1000, an abdomen diffusion-weighted image 42B indicating the abdomen with b=1000, and a waist diffusion-weighted image 42C indicating the waist with b=1000.

That is, the storage 26 stores a series of breast diffusion-weighted images 40A, a series of abdomen diffusion-weighted images 40B, a series of waist diffusion-weighted images 40C, a series of breast diffusion-weighted images 42A, a series of abdomen diffusion-weighted images 42B, and a series of waist diffusion-weighted images 42C.

For convenience of description, the breast diffusion-weighted images 40A, the abdomen diffusion-weighted images 40B, the waist diffusion-weighted images 40C, the breast diffusion-weighted images 42A, the abdomen diffusion-weighted images 42B, and the waist diffusion-weighted images 42C will be referred to as "site diffusion-weighted images" without reference numerals unless distinguished separately.

The following describes functional units implemented by the processor 24 operating in accordance with the image generation and output processing program 36, and the processing performed by the functional units.

Site ADC Map Generation Unit

Figure 5:
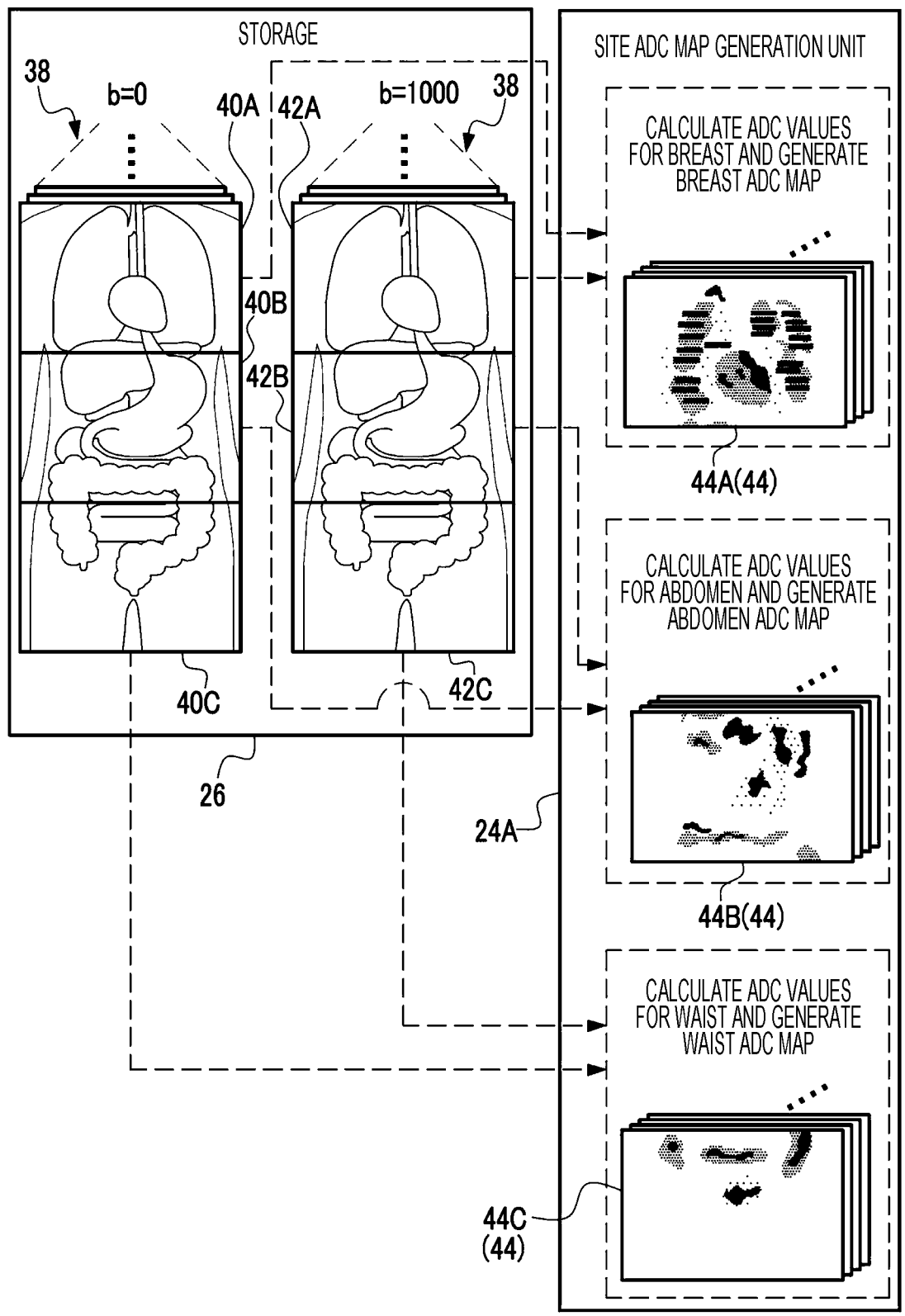
FIG. 5 is a conceptual diagram illustrating an example of processing performed by a site ADC map generation unit.

As illustrated in FIG. 5, the site ADC map generation unit 24A calculates an ADC value on the basis of a diffusion-weighted image (site diffusion-weighted image) for each of the plurality of sites included in the photographic subject. Further, the site ADC map generation unit 24A generates a site ADC map on the basis of the ADC values. A site ADC map 44 include a breast ADC map 44A, an abdomen ADC map 44B, and a waist ADC map 44C.

Specifically, as an example, as illustrated in FIG. 5, the site ADC map generation unit 24A acquires a plurality of site diffusion-weighted images from the storage 26. The plurality of site diffusion-weighted images include site diffusion-weighted images captured with different b-values. In other words, the site ADC map generation unit 24A acquires diffusion-weighted images with different b-values for the breast, the abdomen, and the waist. Further, the site ADC map generation unit 24A calculates ADC values among the diffusion-weighted images with different b-values for the breast, the abdomen, and the waist.

More specifically the site ADC map generation unit 24A acquires diffusion-weighted images of the breast, the abdomen, and the waist with a first b-value (b=0) and acquires diffusion-weighted images of the breast, the abdomen, and the waist with a second b-value (b=1000). Further, the site ADC map generation unit 24A derives an ADC value for each of the plurality of sites on the basis of the first diffusion-weighted image (first site diffusion-weighted images) and the second diffusion-weighted image (second site diffusion-weighted image). In other words, the site ADC map generation unit 24A calculates, for each of the breast, the abdomen, and the waist, ADC values between the diffusion-weighted image with the first b-value and the diffusion-weighted image with the second b-value. That is, the site ADC map generation unit 24A calculates ADC values for the plurality of breast diffusion-weighted images 40A and 42A, ADC values for the plurality of abdomen diffusion-weighted images 40B and 42B, and ADC values for the waist diffusion-weighted images 40C and 42C.

Thereafter, the site ADC map generation unit 24A generates the site ADC map 44 on the basis of the calculated ADC values. The site ADC map 44 is classified into the breast ADC map 44A, the abdomen ADC map 44B, and the waist ADC map 44C. Specifically, the site ADC map generation unit 24A generates the breast ADC map 44A on the basis of the ADC values for the breast diffusion-weighted images 40A and 42A. The site ADC map generation unit 24A further generates the abdomen ADC map 44B on the basis of the ADC values for the abdomen diffusion-weighted images 40B and 42B. The site ADC map generation unit 24A further generates the waist ADC map 44C on the basis of the ADC values for the waist diffusion-weighted images 40C and 42C.

Specifically, in the example illustrated in FIG. 5, the site ADC map generation unit 24A acquires the plurality of breast diffusion-weighted images 40A and 42A having different b-values from the storage 26 in units of series. Then, the site ADC map generation unit 24A calculates ADC values for the series of breast diffusion-weighted images 40A and 42A acquired from the storage 26, on a frame-by-frame basis, starting from the first frame to the last frame. Thereafter, the site ADC map generation unit 24A maps the calculated ADC values on a frame-by-frame basis. In this way, the site ADC map generation unit 24A generates each series of breast ADC maps 44A.

Further, the site ADC map generation unit 24A acquires the plurality of abdomen diffusion-weighted images 40B and 42B having different b-values from the storage 26 in units of series. Then, the site ADC map generation unit 24A calculates ADC values for the series of abdomen diffusion-weighted images 40B and 42B acquired from the storage 26, on a frame-by-frame basis, starting from the first frame to the last frame. Thereafter, the site ADC map generation unit 24A maps the calculated ADC values on a frame-by-frame basis. In this way, the site ADC map generation unit 24A generates each series of abdomen ADC maps 44B.

Further, the site ADC map generation unit 24A acquires the plurality of waist diffusion-weighted images 40C and 42C having different b-values from the storage 26 in units of series. Then, the site ADC map generation unit 24A calculates ADC values for the series of waist diffusion-weighted images 40C and 42C acquired from the storage 26, on a frame-by-frame basis, starting from the first frame to the last frame. Thereafter, the site ADC map generation unit 24A maps the calculated ADC values on a frame-by-frame basis. In this way, the site ADC map generation unit 24A generates each series of waist ADC maps 44C.

While a form in which the site ADC map generation unit 24A calculates ADC values on a frame-by-frame basis, starting from the first frame to the last frame of diffusion-weighted images of each site, has been described here as an example, the technology of the present disclosure is not limited to this. For example, an ADC value of a representative frame may be calculated for every several frames. More specifically, frames obtained by thinning out frames at intervals of several frames, frames averaged over several frames, or the like may be used as representative frames, and ADC values of the representative frames may be calculated.

Calculating an ADC value is an example of "deriving an ADC value" according to the technology of the present disclosure, and the calculation of an ADC value is implemented by, for example, using Formula (1) described above. The calculation of an ADC value using Formula (1) is merely an example. For example, an ADC value may be derived by using an ADC value derivation table (not illustrated) with b1, b2, S1, and S2 included in Formula (1) as input and the ADC value as output.

Composite Diffusion-Weighted Image Generation Unit

Figure 6:
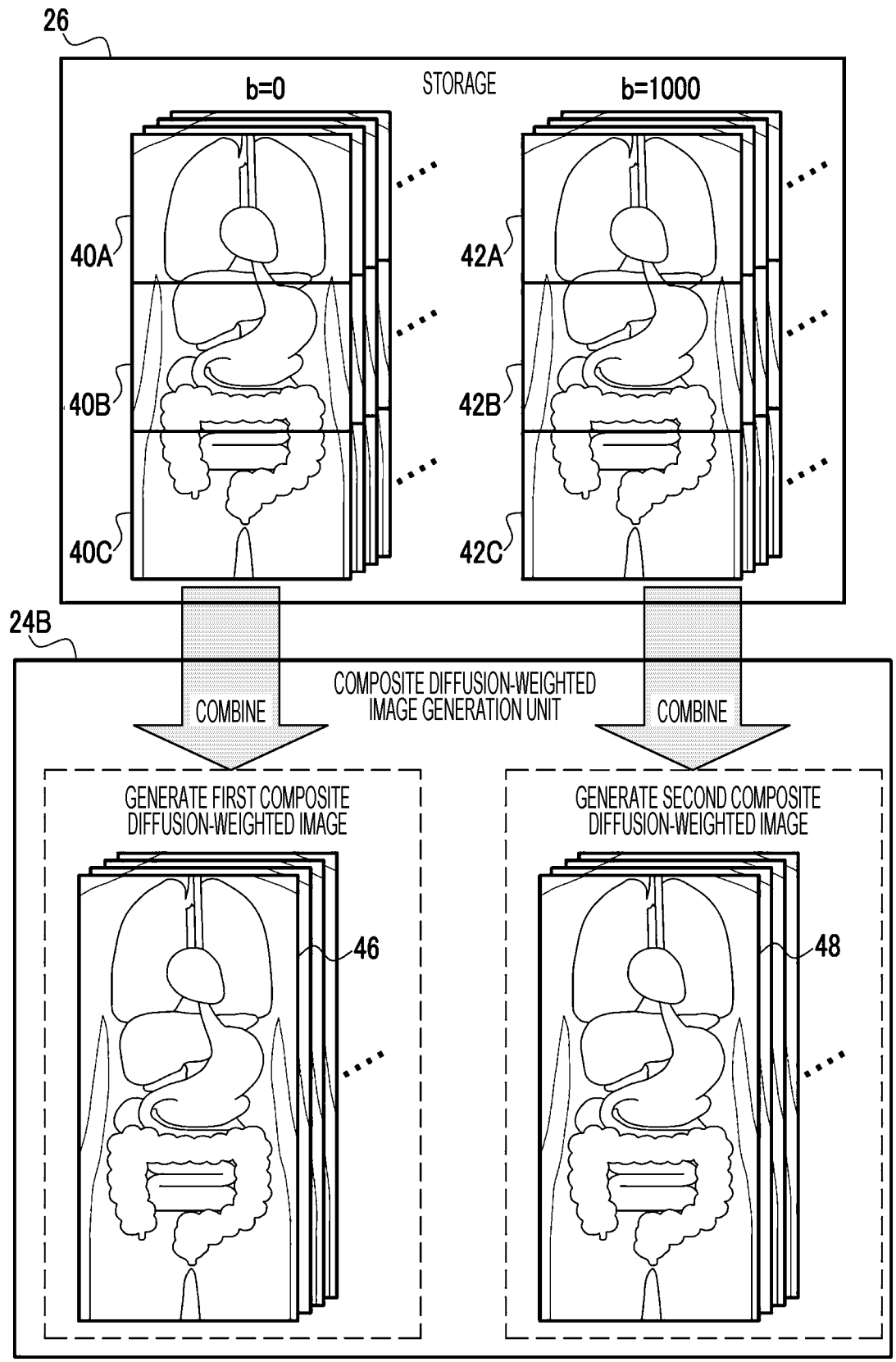
FIG. 6 is a conceptual diagram illustrating an example of processing performed by a composite diffusion-weighted image generation unit 24B.

As illustrated in FIG. 6, the composite diffusion-weighted image generation unit 24B combines site diffusion-weighted images for a plurality of sites to generate a composite diffusion-weighted image. In other words, the composite diffusion-weighted image generation unit 24B combines a series of site diffusion-weighted images for all of the sites included in a photographic subject to generate a composite diffusion-weighted image, which is a diffusion-weighted image of the entire photographic subject. The composite diffusion-weighted image generation unit 24B combines site diffusion-weighted images having the same intensity of a gradient magnetic field during imaging to generate a composite diffusion-weighted image. In other words, the composite diffusion-weighted image is a diffusion-weighted image of the entire photographic subject obtained by combining, for each b-value, series of site diffusion-weighted images for a plurality of sites.

The composite diffusion-weighted image includes a first composite diffusion-weighted image 46 and a second composite diffusion-weighted image 48. The first composite diffusion-weighted image 46 is a composite image of site diffusion-weighted images for a plurality of sites with b=0. The second composite diffusion-weighted image 48 is a composite image of site diffusion-weighted images for a plurality of sites with b=1000. Designated one of the first composite diffusion-weighted image 46 and the second composite diffusion-weighted image 48 is combined into a composite ADC map 50 (see FIG. 6 and FIG. 8) by the composite ADC map generation unit 24C described below.

Specifically, the composite diffusion-weighted image generation unit 24B acquires a plurality of site diffusion-weighted images having different b-values for the breast, the abdomen, and the waist. Further, the composite diffusion-weighted image generation unit 24B combines a plurality of site diffusion-weighted images for each b-value.

More specifically, the composite diffusion-weighted image generation unit 24B acquires the series of breast diffusion-weighted images 40A, the series of abdomen diffusion-weighted images 40B, and the series of waist diffusion-weighted images 40C from the storage 26. The composite diffusion-weighted image generation unit 24B combines the breast diffusion-weighted image 40A, the abdomen diffusion-weighted image 40B, and the waist diffusion-weighted image 40C of the same series on a frame-by-frame basis, starting from the first frame to the last frame. As a result, the composite diffusion-weighted image generation unit 24B generates each series of first composite diffusion-weighted images 46.

Further, the composite diffusion-weighted image generation unit 24B acquires the series of breast diffusion-weighted images 42A, the series of abdomen diffusion-weighted images 42B, and the series of waist diffusion-weighted images 42C from the storage 26. The composite diffusion-weighted image generation unit 24B combines the breast diffusion-weighted image 42A, the abdomen diffusion-weighted image 42B, and the waist diffusion-weighted image 42C of the same series on a frame-by-frame basis, starting from the first frame to the last frame. As a result, the composite diffusion-weighted image generation unit 24B generates each series of second composite diffusion-weighted images 48.

Composite ADC Map Generation Unit

Figure 7:
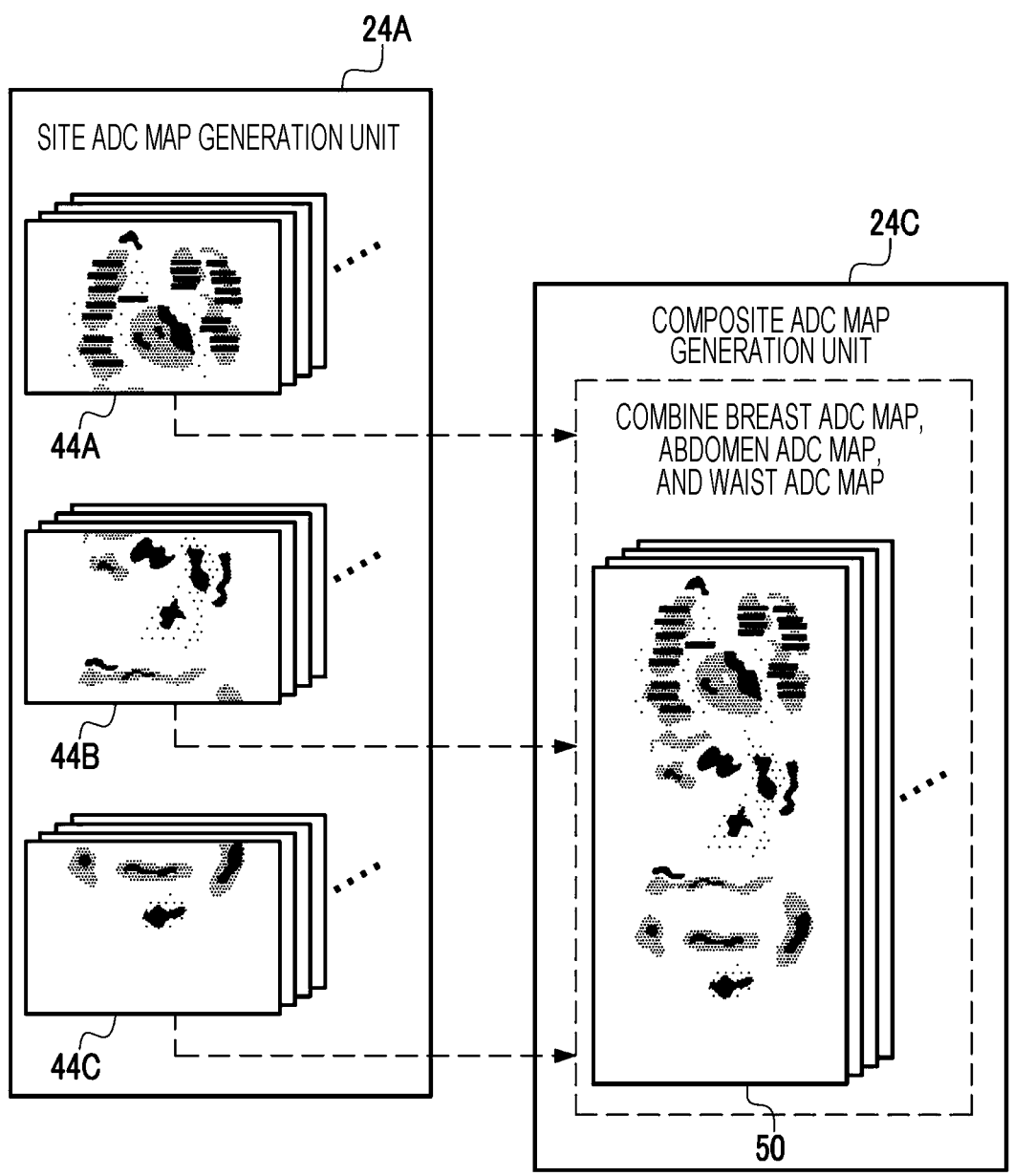
FIG. 7 is a conceptual diagram illustrating an example of processing performed by a composite ADC map generation unit 24C.

As illustrated in FIG. 7, the composite ADC map generation unit 24C combines the plurality of site ADC maps 44 (44A, 44B, and 44C) to generate the composite ADC map 50. That is, the composite ADC map generation unit 24C generates the composite ADC map 50 for all of the sites included in the photographic subject on the basis of the plurality of site ADC maps 44. That is, the composite ADC map generation unit 24C combines the ADC values obtained from the respective site ADC maps 44 and generates a composite ADC map.

Specifically, the composite ADC map generation unit 24C combines the series of breast ADC maps 44A, the series of abdomen ADC maps 44B, and the series of waist ADC maps 44C on a frame-by-frame basis, starting from the first frame to the last frame, to generate each series of composite ADC maps 50. That is, the breast ADC map 44A, the abdomen ADC map 44B, and the waist ADC map 44C, which are obtained by mapping the ADC values of the breast, the ADC values of the abdomen, and the ADC values of the waist, respectively, are combined by the composite ADC map generation unit 24C to generate the composite ADC map 50. The composite ADC map 50 is an example of an "ADC image" according to the technology of the present disclosure.

Composite Image Generation Unit

Figure 8:
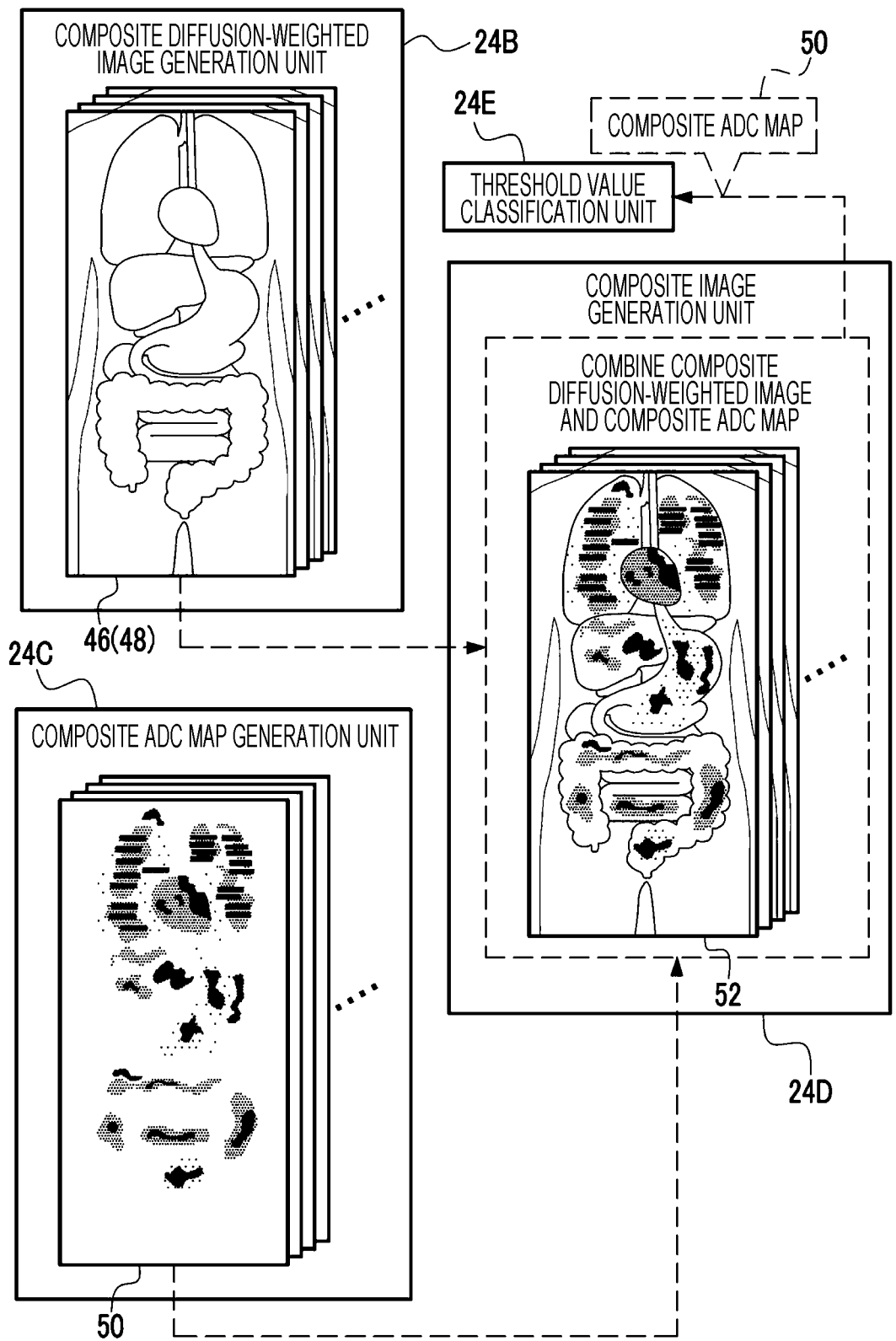
FIG. 8 is a conceptual diagram illustrating an example of processing performed by a composite image generation unit 24D.

The composite image generation unit 24D combines the composite diffusion-weighted image and the composite ADC map 50 to generate a composite image 52. As an example, as illustrated in FIG. 8, the composite image generation unit 24D combines a designated composite diffusion-weighted image among the first composite diffusion-weighted image 46 and the second composite diffusion-weighted image 48 with the composite ADC map 50 to generate the composite image 52. In other words, the composite diffusion-weighted image to be combined with the composite ADC map 50 is a designated composite diffusion-weighted image among the first composite diffusion-weighted image 46 and the second composite diffusion-weighted image 48.

Specifically, the series of designated composite diffusion-weighted images is combined with the series of composite ADC maps 50 on a frame-by-frame basis, starting from the first frame to the last frame, to generate each series of composite images 52. The composite diffusion-weighted image to be combined with the composite ADC map 50 is selected from the first composite diffusion-weighted image 46 and the second composite diffusion-weighted image 48 in accordance with, for example, an instruction accepted by the acceptance device 14 (see FIG. 2) or various conditions (for example, imaging conditions). The composite image generation unit 24D combines the composite diffusion-weighted image and the composite ADC map of the same series to generate the composite image 52.

Examples of the composite image 52 include an image obtained by superimposing a composite diffusion-weighted image and the composite ADC map 50. The composite diffusion-weighted image and the composite ADC map 50 are superimposed in units of series. That is, the series of composite diffusion-weighted images and the series of composite ADC maps 50 are superimposed on a frame-by-frame basis, starting from the first frame to the last frame, to implement superimposition of composite diffusion-weighted images and composite ADC maps 50 on a series-by-series basis.

Examples of a method for superimposing two images (here, the composite diffusion-weighted image and the composite ADC map 50) include alpha blending. In this case, changing the alpha value changes the transparency of the images to be superimposed. The alpha value may be a fixed value or may be a variable value that is changed in accordance with an instruction accepted by the acceptance device 14 (see FIG. 2) or in accordance with various conditions (for example, imaging conditions). Other examples of the composite image 52 include an image obtained by embedding the composite ADC map 50 in the composite diffusion-weighted image such that the composite diffusion-weighted image and the composite ADC map 50 are integrated into an image.

Threshold Value Classification Unit

The threshold value classification unit 24E classifies signal values in the composite ADC map 50 and enables conversion of the composite ADC map 50 into a heat map. In the present embodiment, as an example, the signal values in the composite ADC map 50 are used as ADC values. The ADC values are also referred to as "signal values".

Figure 9:
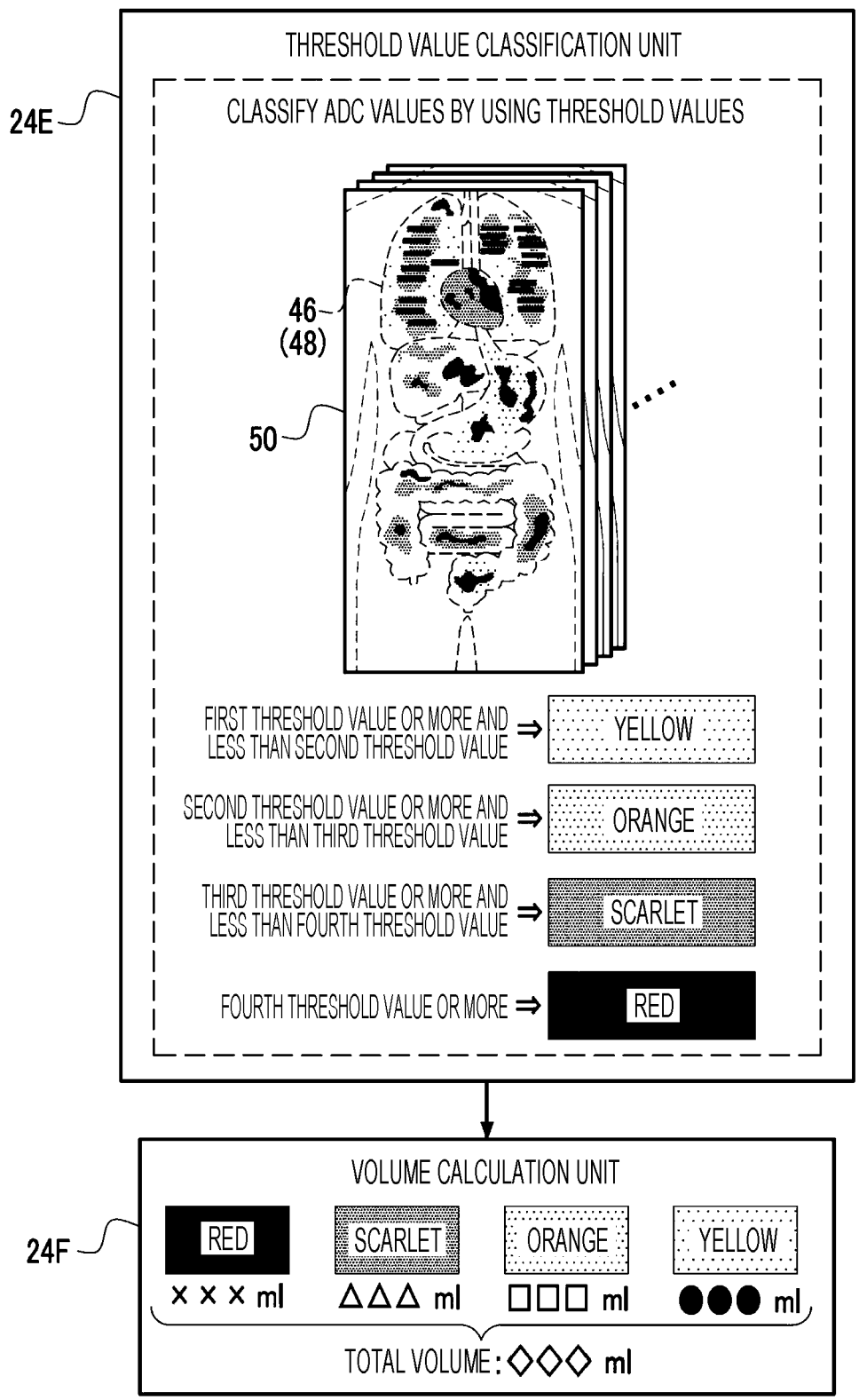
FIG. 9 is a conceptual diagram illustrating an example of processing performed by a threshold value classification unit and processing performed by a volume calculation unit.

The threshold value classification unit 24E acquires the composite ADC map 50 included in the composite image 52. As illustrated in FIG. 9, the threshold value classification unit 24E classifies the signal values in the composite ADC map 50 by using a threshold value.

A plurality of threshold values are set within a designated numerical range. In the present embodiment, the numerical range is variable. However, the numerical range may be a certain range. In the present embodiment, furthermore, a plurality of threshold values are set for the numerical range. However, the number of threshold values may be one. Further, the number of threshold values may be a fixed value or may be variable. When at least one of the numerical range or the number of threshold values is variable, the numerical range or the or the number of threshold value is changed in accordance with, for example, an instruction accepted by the acceptance device 14 (see FIG. 2) or various conditions (for example, imaging conditions).

In the example illustrated in FIG. 9, the threshold value classification unit 24E classifies the signal values in the composite ADC map 50 by using a plurality of threshold values. Specifically, the threshold value classification unit 24E uses four threshold values, namely, a first threshold value, a second threshold value, a third threshold value, and a fourth threshold value, to classify the ADC values. More specifically, the threshold value classification unit 24E classifies the signal values in the composite ADC map 50 into a plurality of threshold value ranges set by a plurality of threshold values. The threshold value classification unit 24E classifies the ADC values into a range less than the first threshold value, a range greater than or equal to the first threshold value and less than the second threshold value, a range greater than or equal to the second threshold value and less than the third threshold value, a range greater than or equal to the third threshold value and less than the fourth threshold value, and a range greater than or equal to the fourth threshold value.

Further, the threshold value classification unit 24E assigns colors corresponding to the threshold value ranges into which the ADC values are classified in the composite ADC map 50 included in the composite image 52. Specifically, yellow is set for the range greater than or equal to the first threshold value and less than the second threshold value. Orange is set for the range greater than or equal to the second threshold value and less than the third threshold value. Scarlet is set for the range greater than or equal to the third threshold value and less than the fourth threshold value. Red is set for the range greater than or equal to the fourth threshold value. No color is set for the range less than the first threshold value. As a result, the threshold value classification unit 24E assigns no color to pixels having ADC values in the range less than the first threshold value. Further, the threshold value classification unit 24E assigns yellow to pixels having ADC values in the range greater than or equal to the first threshold value and less than the second threshold value, assigns orange to pixels having ADC values in the range greater than or equal to the second threshold value and less than the third threshold value, assigns scarlet to pixels having ADC values in the range greater than or equal to the third threshold value and less than the fourth threshold value, and assigns red to pixels having ADC values in the range greater than or equal to the fourth threshold value. As a result, the composite ADC map 50 included in the composite image 52 is converted into a heat map. The composite ADC map 50, which is converted into a heat map, is an example of a "classification result image" according to the technology of the present disclosure and indicates a result of classifying signal values by using a threshold value.

Volume Calculation Unit

The volume calculation unit 24F calculates a volume in real space (real-space volume) by using information on a three-dimensional image region, which is obtained on the basis of signal values classified into a plurality of threshold value ranges. In other words, the volume calculation unit 24F calculates a real-space volume corresponding to a three-dimensional image region obtained from the series of composite ADC maps 50. The three-dimensional image region is obtained on the basis of information on the signal values classified by using the first threshold value, the second threshold value, the third threshold value, and the fourth threshold value. The volume calculation unit 24F converts the volume of the three-dimensional image region into a real-space volume by using a predetermined arithmetic expression or table.

Specifically, the real-space volume calculated by the volume calculation unit 24F includes a first real-space volume, a second real-space volume, a third real-space volume, and a fourth real-space volume.

The first real-space volume is a real-space volume corresponding to a three-dimensional image region having a distribution of pixels indicating signal values classified in the range greater than or equal to the first threshold value and less than the second threshold value among the series of composite ADC maps 50. The three-dimensional image region with the first real-space volume is, for example, a region of pixels whose signal values are distributed in the range greater than or equal to the first threshold value and less than the second threshold value throughout the series of composite ADC maps 50, and is a region having a distribution of pixels colored in yellow among the series of composite ADC maps 50.

The second real-space volume is a real-space volume corresponding to a three-dimensional image region having a distribution of pixels indicating signal values classified in the range greater than or equal to the second threshold value and less than the third threshold value among the series of composite ADC maps 50. The three-dimensional image region with the second real-space volume is, for example, a region of pixels whose signal values are distributed in the range greater than or equal to the second threshold value and less than the third threshold value throughout the series of composite ADC maps 50, and is a region having a distribution of pixels colored in orange among the series of composite ADC maps 50.

The third real-space volume is a real-space volume corresponding to a three-dimensional image region having a distribution of pixels indicating signal values classified in the range greater than or equal to the third threshold value and less than the fourth threshold value among the series of composite ADC maps 50. The three-dimensional image region with the third real-space volume is, for example, a region of pixels whose signal values are distributed in the range greater than or equal to the third threshold value and less than the fourth threshold value throughout the series of composite ADC maps 50, and is a region having a distribution of pixels colored in scarlet among the series of composite ADC maps 50.

The fourth real-space volume is a real-space volume corresponding to a three-dimensional image region having a distribution of pixels indicating signal values classified in the range greater than or equal to the fourth threshold value among the series of composite ADC maps 50. The three-dimensional image region with the fourth real-space volume is, for example, a region of pixels whose signal values are distributed in the range greater than or equal to the fourth threshold value throughout the series of composite ADC maps 50, and is a region having a distribution of pixels colored in red among the series of composite ADC maps 50.

Further, the volume calculation unit 24F calculates the sum of all the real-space volumes. Specifically, the volume calculation unit 24F calculates a total volume that is the sum of the first real-space volume, the second real-space volume, the third real-space volume, and the fourth real-space volume.

Display Control Unit

Figure 10:
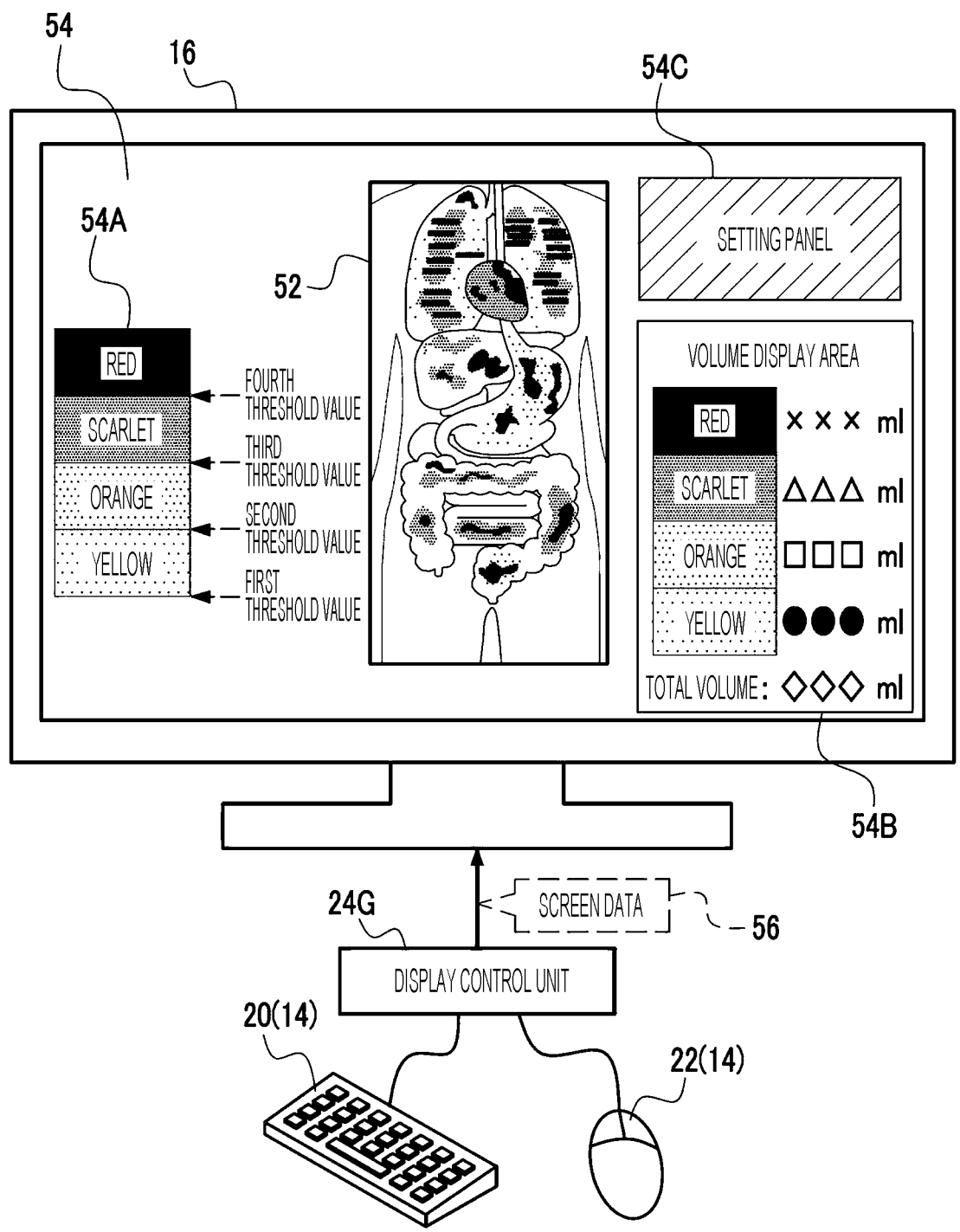
FIG. 10 is a conceptual diagram illustrating an example of a form of a screen displayed on a display.

As an example, as illustrated in FIG. 10, the display control unit 24G performs GUI (Graphical User Interface) control in accordance with an instruction accepted by the acceptance device 14 to cause the display 16 to display a screen 54. The display control unit 24G outputs screen data 56 to the display 16. The screen data 56 is data for displaying the composite image 52 on the display 16. The screen data 56 is an example of "data" according to the technology of the present disclosure.

In the example illustrated in FIG. 10, the screen data 56 is data indicating the screen 54. The display control unit 24G inputs the screen data 56 to the display 16. As a result, the display 16 displays the screen 54 based on the screen data 56.

The screen 54 includes the composite image 52. The composite image 52 includes the composite ADC map 50 converted into a heat map. The screen 54 further includes a legend 54A, a volume display area 54B, a setting panel 54C, and so on.

Further, the display control unit 24G changes the content of the screen data 56 in accordance with an instruction accepted by the acceptance device 14. Specifically, the display control unit 24G changes the frame rate for displaying the series of composite images 52 on the display 16, thins out frames in the series of composite images 52, or changes the composite image 52 to be displayed on the display 16 to a still image.

The composite image 52 is displayed on the display 16 in units of series. For example, the display 16 displays the composite image 52 as a moving image. Specifically, the display 16 sequentially displays the series of composite images 52, starting from the first frame to the last frame, at a predetermined frame rate (for example, 30 frames/second).

The screen 54 further includes the legend 54A, the volume display area 54B, and the setting panel 54C. The legend 54A indicates the meaning of colors assigned to the composite image 52. In the example illustrated in FIG. 10, the legend 54A indicates that, in the composite ADC map 50 included in the composite image 52 and converted into a heat map, pixels corresponding to signal values classified in the range greater than or equal to the first threshold value and less than the second threshold value are assigned yellow, pixels corresponding to signal values classified in the range greater than or equal to the second threshold value and less than the third threshold value are assigned orange, pixels corresponding to signal values classified in the range greater than or equal to the third threshold value and less than the fourth threshold value are assigned scarlet, and pixels corresponding to signal values classified in the range greater than or equal to the fourth threshold value are assigned red.

The volume display area 54B displays calculation results obtained by the volume calculation unit 24F (see FIG. 9). In the example illustrated in FIG. 10, the volume display area 54B displays the first real-space volume, the second real-space volume, the third real-space volume, the fourth real-space volume, and the total volume.

The setting panel 54C is a panel for accepting an instruction to change various setting parameters. The various setting parameters are accepted through an operation performed using the acceptance device 14. Examples of the various setting parameters include the first threshold value, the second threshold value, the third threshold value, the fourth threshold value, the numerical range, the colors corresponding to the threshold value ranges, and/or and the number of threshold values set in the numerical range. As described above, the colors corresponding to the threshold value ranges mean colors assigned to pixels having signal values classified into a plurality of threshold value ranges.

While a form in which the screen data 56 is output to the display 16 has been described here as an example, the technology of the present disclosure is not limited to this. For example, the screen data 56 may be output to the storage 26 or an external device connected to a network (not illustrated). The external device is, for example, a personal computer, a server, a printer, and/or the like. Further, the screen data 56 may be output to a memory (for example, a USB memory) or the like connected to the external OF 32, or may be output to a printer or the like connected to the external OF 32.

Operation

Next, the operation of the medical operation support apparatus 10 will be described with reference to FIG. 11.

Figure 11:
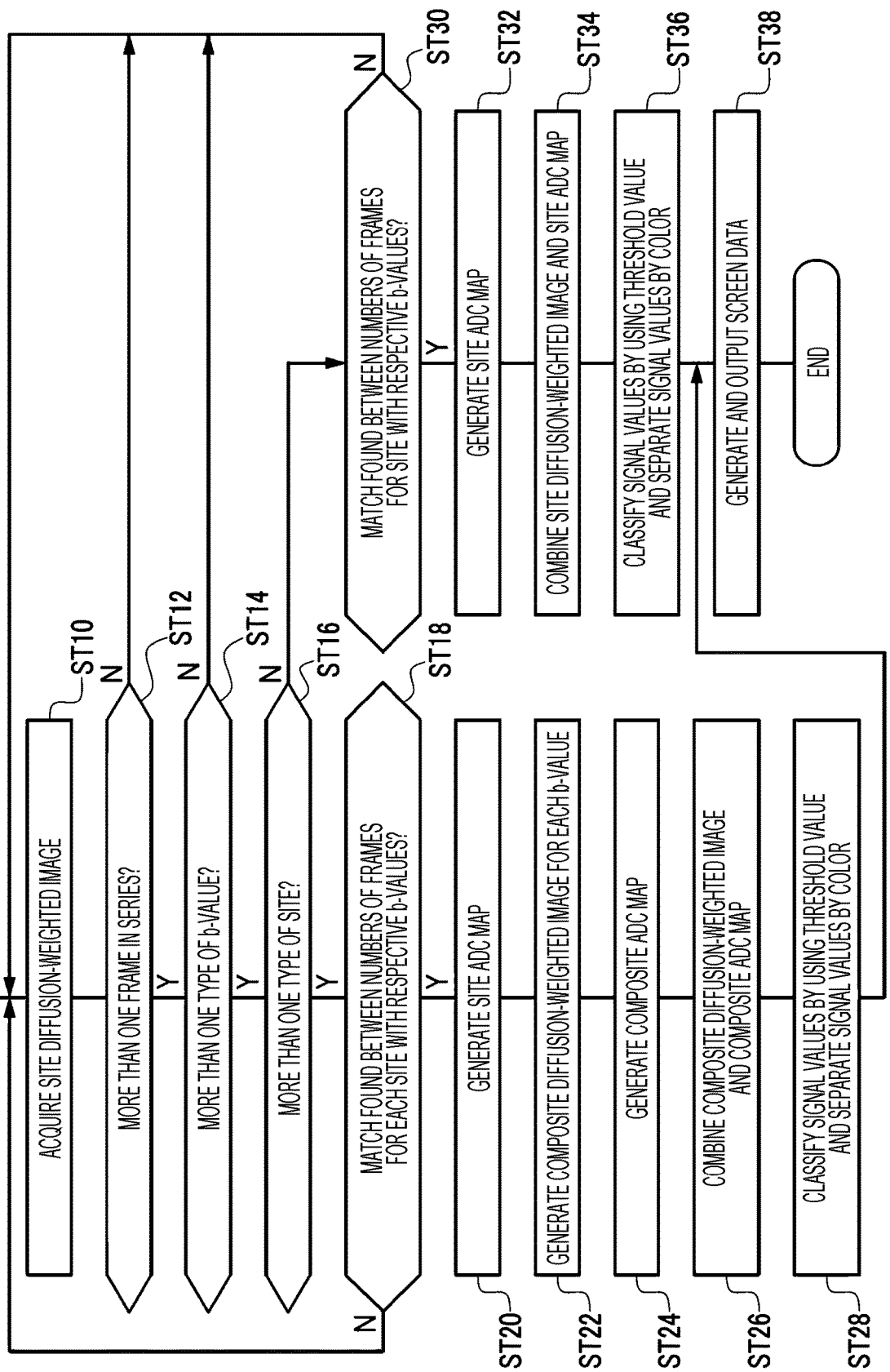
FIG. 11 is a flowchart illustrating an example of the flow of an image generation and output process.

FIG. 11 illustrates an example of the flow of an image generation and output process performed by the processor 24. The flow of the image generation and output process illustrated in FIG. 11 is an example of an "image processing method" according to the technology of the present disclosure. The following description will be given on the assumption that the storage 26 stores a site diffusion-weighted image related to at least one site, for convenience of description.

In the image generation and output process illustrated in FIG. 11, first, in step ST10, the site ADC map generation unit 24A acquires a site diffusion-weighted image, which has yet to be acquired, from the storage 26. After the processing of step ST10 is executed, the image generation and output process proceeds to step ST12.

In step ST12, the site ADC map generation unit 24A determines whether the number of frames in a series of site diffusion-weighted images acquired at present is more than one. If the number of frames in the series of site diffusion-weighted images acquired at present is one in step ST12, the image generation and output process proceeds to step ST10. If the number of frames in the series of site diffusion-weighted images acquired at present is more than one in step ST12, the image generation and output process proceeds to step ST14.

In step ST14, the site ADC map generation unit 24A determines whether the number of types of b-values related to the site diffusion-weighted images acquired at present is more than one. If the number of types of b-values related to the site diffusion-weighted images acquired at present is one in step ST14, the image generation and output process proceeds to step ST10. If the number of types of b-values related to the site diffusion-weighted images acquired at present is more than one in step ST14, the image generation and output process proceeds to step ST16.

In step ST16, the site ADC map generation unit 24A determines whether the number of types of sites related to the site diffusion-weighted images acquired at present is more than one. If the number of types of sites related to the site diffusion-weighted images acquired at present is one in step ST16, the image generation and output process proceeds to step ST30. If the number of types of sites related to the site diffusion-weighted images acquired at present is more than one in step ST16, the image generation and output process proceeds to step ST18.

In step ST18, the site ADC map generation unit 24A determines whether a match is found between the numbers of frames in the series for each site diffusion-weighted image with the respective b-values. In other words, the site ADC map generation unit 24A determines whether the number of frames included in the series for each site diffusion-weighted image with b=0 matches the number of frames included in the series for each site diffusion-weighted image with b=1000. If no match is found between the numbers of frames in the series for each site diffusion-weighted image with the respective b-values in step ST18, the image generation and output process proceeds to step ST10. If a match is found between the numbers of frames in the series for each site diffusion-weighted image with the respective b-values in step ST18, the image generation and output process proceeds to step ST20.

In step ST20, the site ADC map generation unit 24A calculates ADC values from each frame in the series for each acquired site diffusion-weighted image and maps the calculated ADC values for each frame in the series to generate a series of site ADC maps 44 (see FIG. 5).

Specifically, as illustrated in FIG. 5, the site ADC map generation unit 24A calculates ADC values by using site diffusion-weighted images for a plurality of different b-values. Further, the site ADC map generation unit 24A maps the obtained ADC values on a frame-by-frame basis to generate each series of site ADC maps 44.

More specifically, the site ADC map generation unit 24A calculates ADC values on the basis of a frame included in the series of breast diffusion-weighted images with b=0 and a frame included in the series of breast diffusion-weighted images with b=1000. The site ADC map generation unit 24A generates a breast ADC map 44A on the basis of the obtained ADC values. Further, the site ADC map generation unit 24A calculates ADC values on the basis of a frame included in the series of abdomen diffusion-weighted images with b=0 and a frame included in the series of abdomen diffusion-weighted images with b=1000. The site ADC map generation unit 24A generates an abdomen ADC map 44B on the basis of the obtained ADC values. Further, the site ADC map generation unit 24A calculates ADC values on the basis of a frame included in the series of waist diffusion-weighted images with b=0 and a frame included in the series of waist diffusion-weighted images with b=1000. The site ADC map generation unit 24A generates a waist ADC map 44C on the basis of the obtained ADC values.

In step ST20, accordingly, for example, the breast ADC map 44A, the abdomen ADC map 44B, and the waist ADC map 44C are generated in units of series as the site ADC maps 44 (see FIG. 5). After the processing of step ST20 is executed, the image generation and output process proceeds to step ST22.

In step ST22, the composite diffusion-weighted image generation unit 24B combines a series of a plurality of site diffusion-weighted images for each b-value to generate a composite diffusion-weighted image (see FIG. 6). Specifically, the composite diffusion-weighted image generation unit 24B combines a plurality of site diffusion-weighted images with b=0 in units of series to generate a series of first composite diffusion-weighted images 46. Further, the composite diffusion-weighted image generation unit 24B combines a plurality of site diffusion-weighted images with b=1000 in units of series to generate a series of second composite diffusion-weighted images 48. After the processing of step ST22 is executed, the image generation and output process proceeds to step ST24.

In step ST24, the composite ADC map generation unit 24C combines a series of a plurality of site ADC maps 44 generated in step ST20 (see FIG. 7) to generate a series of composite ADC maps 50. In step ST24, for example, a series of images in which the breast ADC maps 44A, the abdomen ADC maps 44B, and the waist ADC maps 44C are joined together in units of series is generated as a series of composite ADC maps 50 (see FIG. 7). In other words, the composite ADC map generation unit 24C combines the breast ADC map 44A, the abdomen ADC map 44B, and the waist ADC map 44C of the same series to generate a composite ADC map 50 including all of the sites of the photographic subject. After the processing of step ST24 is executed, the image generation and output process proceeds to step ST26.

In step ST26, the composite image generation unit 24D combines a composite diffusion-weighted image and the composite ADC map 50 to generate a composite image 52 (see FIG. 8). Specifically, the composite image generation unit 24D combines a designated one of the series of first composite diffusion-weighted images 46 and the series of second composite diffusion-weighted images 48 with the series of composite ADC maps 50 to generate a series of composite images 52. The series of composite diffusion-weighted images and the series of composite ADC maps 50 are combined by, for example, superimposing the series of composite ADC maps 50 on the series of composite diffusion-weighted images on a frame-by-frame basis. After the processing of step ST26 is executed, the image generation and output process proceeds to step ST28.

In step ST28, the threshold value classification unit 24E classifies the signal values in the composite ADC map 50 by using a threshold value and separate the signal values by color. Specifically, the threshold value classification unit 24E acquires a series of composite ADC maps 50 constituting the composite image 52, and classifies the signal values for each frame in the acquired series of composite ADC maps 50 by using the first to fourth threshold values. Then, the threshold value classification unit 24E assigns colors determined in accordance with the signal values to pixels having signal values classified by using the first to fourth threshold values for each frame in the series of composite ADC maps 50 (see FIG. 9). In other words, the threshold value classification unit 24E assigns a color to a target pixel on the basis of a threshold value range in which the ADC value is classified and a color set for the threshold value range. In step ST28, the volume calculation unit 24F calculates the first to fourth real-space volumes. Further, the volume calculation unit 24F calculates the total volume of the first to fourth real-space volumes. That is, the volume calculation unit 24F calculates a real-space volume corresponding to a three-dimensional image region assigned colors in the series of composite ADC maps 50. After the processing of step ST28 is executed, the image generation and output process proceeds to step ST38.

In step ST30, the site ADC map generation unit 24A determines whether a match is found between the numbers of frames in the series of site diffusion-weighted images with the respective b-values. In other words, the site ADC map generation unit 24A determines whether the number of frames included in the series of site diffusion-weighted images with b=0 matches the number of frames included in the series of site diffusion-weighted images with b=1000. If the number of frames in the series of site diffusion-weighted images with b=0 does not match the number of frames in the series of site diffusion-weighted images with b=1000 in step ST30, the image generation and output process proceeds to step ST10. If the number of frames in the series of site diffusion-weighted images with b=0 matches the number of frames in the series of site diffusion-weighted images with b=1000 in step ST30, the image generation and output process proceeds to step ST32.

In step ST32, an image generation and output process in a case where the obtained site diffusion-weighted image is a site diffusion-weighted image for one site is performed. For this reason, the processing is basically the same as the processing of step ST20, except that one site diffusion-weighted image is to be processed. That is, in step ST32, the site ADC map generation unit 24A calculates ADC values from each frame in the series of acquired site diffusion-weighted images and maps the calculated ADC values for each frame in the series. As a result, the site ADC map generation unit 24A generates each series of site ADC maps 44. In step ST32, for example, one of the series of breast ADC maps 44A, the series of abdomen ADC maps 44B, and the series of waist ADC maps 44C is generated as the site ADC maps 44. After the processing of step ST32 is executed, the image generation and output process proceeds to step ST34.

Also in step ST34, an image generation and output process in a case where the obtained site diffusion-weighted image is a site diffusion-weighted image for one site is performed. Specifically, in step ST34, the composite image generation unit 24D combines a site diffusion-weighted image and a site ADC map for one site to generate a site composite image. For example, if the acquired site diffusion-weighted image is the breast diffusion-weighted image 40A, the composite image generation unit 24D combines the breast diffusion-weighted image 40A and the breast ADC map 44A. If the acquired site diffusion-weighted image is the abdomen diffusion-weighted image 40B, the composite image generation unit 24D combines the abdomen diffusion-weighted image 40B and the abdomen ADC map 44B. If the acquired site diffusion-weighted image is the waist diffusion-weighted image 40C, the composite image generation unit 24D combines the waist diffusion-weighted image 40C and the waist ADC map 44C. That is, the composite image generation unit 24D combines the series of acquired site diffusion-weighted images and the series of site ADC maps 44 generated in step ST32 to generate a series of site composite images (not illustrated), which is a series of composite images related to one site. After the processing of step ST34 is executed, the image generation and output process proceeds to step ST36.

Also in step ST36, an image generation and output process in a case where the obtained site diffusion-weighted image is a site diffusion-weighted image for one site is performed. Specifically, in step ST36, the threshold value classification unit 24E acquires a series of site ADC maps 44 constituting a site composite image, and classifies the signal values for each frame in the acquired series of site ADC maps 44 by using the first to fourth threshold values. Thereafter, the threshold value classification unit 24E assigns colors determined in accordance with the signal values to pixels having signal values classified by using the first to fourth threshold values for each frame in the series of the site ADC map 44. In other words, the threshold value classification unit 24E assigns a color to a pixel indicating the ADC value obtained by the site ADC map 44, the color being set for the threshold value range in which the ADC value is classified. In step ST36, the volume calculation unit 24F calculates the first to fourth real-space volumes. Further, the volume calculation unit 24F calculates the total volume of the first to fourth real-space volumes. The volume calculation unit 24F calculates a real-space volume corresponding to a three-dimensional image region assigned colors in the series of site ADC maps 44. After the processing of step ST36 is executed, the image generation and output process proceeds to step ST38.

In step ST38, the display control unit 24G generates the screen data 56 and outputs the screen data 56 to the display 16 (see FIG. 10). If step ST38 is executed after the processing of step ST28, in step ST38, the screen data 56 includes a series of composite images 52. If step ST38 is executed after step ST36, in step ST38, the screen data 56 includes a series of site composite images.

When the screen data 56 is output to the display 16, the display 16 displays the screen 54 or a partial composite image screen (not illustrated). The partial composite image screen is different from the screen 54 in that a series of site composite images is displayed instead of the composite image 52. After the processing of step ST38 is executed, the image generation and output process illustrated in FIG. 11 ends.

Features (1) As described above, the medical operation support apparatus 10 according to the embodiment described above calculates ADC values from a plurality of site diffusion-weighted images and maps the ADC values to generate a plurality of site ADC maps 44. Further, the medical operation support apparatus 10 combines the plurality of site diffusion-weighted images to generate a composite diffusion-weighted image. Further, the medical operation support apparatus 10 combines the plurality of site ADC maps 44 to generate a composite ADC map 50. Further, the medical operation support apparatus 10 combines the composite diffusion-weighted image and the composite ADC map 50 to generate a composite image 52.

An existing medical operation support apparatus combines site diffusion-weighted images for a plurality of sites to generate a composite diffusion-weighted image including site diffusion-weighted images of all of the sites. After that, the existing medical operation support apparatus calculates ADC values on the basis of the composite diffusion-weighted image, and generates an ADC map on the basis of the ADC values.

By contrast, the medical operation support apparatus 10 according to the present embodiment calculates an ADC value from each of the plurality of site diffusion-weighted images and generates a plurality of site ADC maps 44 by using the ADC values. Further, the medical operation support apparatus 10 combines the plurality of site ADC maps 44 to generate a composite ADC map 50. Further, the medical operation support apparatus 10 combines the site diffusion-weighted images to generate a composite diffusion-weighted image, and then combines the composite ADC map 50 and the composite diffusion-weighted image.

For this reason, in the existing medical operation support apparatus, during the combining of a plurality of site diffusion-weighted images, signal values (for example, ADC values) of joints where the site diffusion-weighted images are joined together are converted. For this reason, in the ADC map obtained by the existing medical operation support apparatus, mapping based on appropriate signal values (ADC values) is not performed. As a result, the accuracy of the ADC map is reduced.

However, the medical operation support apparatus 10 according to the present embodiment generates site ADC maps on the basis of signal values (ADC values) of site diffusion-weighted images before a composite diffusion-weighted image is generated, and then combines the site ADC maps to generate a composite ADC map 50. For this reason, the composite ADC map 50 generated by the medical operation support apparatus 10 according to the present embodiment has improved accuracy over the ADC map generated by the existing medical operation support apparatus. Accordingly, the medical operation support apparatus 10 using the configuration described in the present embodiment can obtain a more accurate composite image 52 than a composite image based on ADC values derived from a composite diffusion-weighted image obtained by combining diffusion-weighted images of a plurality of sites.

(2) After the ADC values are calculated, the medical operation support apparatus 10 generates a composite diffusion-weighted image and generates the composite ADC map 50. In other words, the medical operation support apparatus 10 derives ADC values before a composite diffusion-weighted image is generated, and then generates the composite diffusion-weighted image and a composite ADC map. Accordingly, this configuration makes it possible to obtain a more accurate composite image 52 than an existing image obtained by combining a diffusion-weighted image and an ADC map using ADC values calculated after combining a plurality of site diffusion-weighted images.

Further, the medical operation support apparatus 10 acquires a plurality of site diffusion-weighted images for each b-value during imaging performed with the MRI device, and calculates ADC values from the plurality of site diffusion-weighted images. Accordingly, this configuration makes it possible to obtain more accurate ADC values than ADC values calculated after a plurality of site diffusion-weighted images are combined.

Further, the medical operation support apparatus 10 combines a designated composite diffusion-weighted image among the first composite diffusion-weighted image 46 and the second composite diffusion-weighted image 48 with the composite ADC map 50. Accordingly, this configuration makes it possible to reduce the processing load for combining as compared to combining of the composite ADC map 50 with each of the first composite diffusion-weighted image 46 and the second composite diffusion-weighted image 48.

Further, the medical operation support apparatus 10 classifies the signal values in the composite ADC map 50 by using the first to fourth threshold values. Accordingly, this configuration makes it possible to easily identify a difference between signal values in the composite ADC map 50.

In the medical operation support apparatus 10, a plurality of threshold values are set within a designated numerical range. Accordingly, this configuration makes it possible to more accurately identify a difference between signal values in the composite ADC map 50 than in a case where a single threshold value is used.

In the medical operation support apparatus 10, furthermore, the numerical range of threshold values that can be set for classification of signal values is variable. For example, the medical operation support apparatus 10 can set a threshold value by using a different numerical range in accordance with the type of target disease. Accordingly, this configuration makes it possible to more accurately identify a difference between signal values in the composite ADC map 50 for each of a plurality of types of diseases than in a case where the numerical range is constant. That is, the medical operation support apparatus 10 can generate accurate composite images even for various diseases.

In the medical operation support apparatus 10, the number of threshold values set within a numerical range is variable. Accordingly, this configuration makes it possible to more accurately identify a difference between signal values in the composite ADC map 50 at a resolution intended by the user 18 than in a case where the number of threshold values is fixed.

Further, in the medical operation support apparatus 10, the screen data 56 is output to the display 16. The display 16 displays the screen 54 indicated by the screen data 56. The screen 54 includes the composite image 52, which is obtained by superimposing the composite ADC map 50 converted into a heat map on the composite diffusion-weighted image, and the composite image 52 is visually recognized by the user 18. Accordingly, this configuration makes it easy for the user 18 to visually recognize a difference between signal values in the composite ADC map 50.

Modifications (1) The embodiment described above describes an example in which the composite image 52 constituted by the composite diffusion-weighted image and the composite ADC map 50 is generated and then the signal values in the composite ADC map 50 included in the composite image 52 are classified by using the first to fourth threshold values. However, the technology of the present disclosure is not limited to this. For example, the signal values in the composite ADC map 50 may be classified by using the first to fourth threshold values at a stage before the composite image 52 is generated. That is, the medical operation support apparatus 10 may classify the signal values in the composite ADC map 50 and then combine the composite diffusion-weighted image and the composite ADC map 50.

Figure 12:
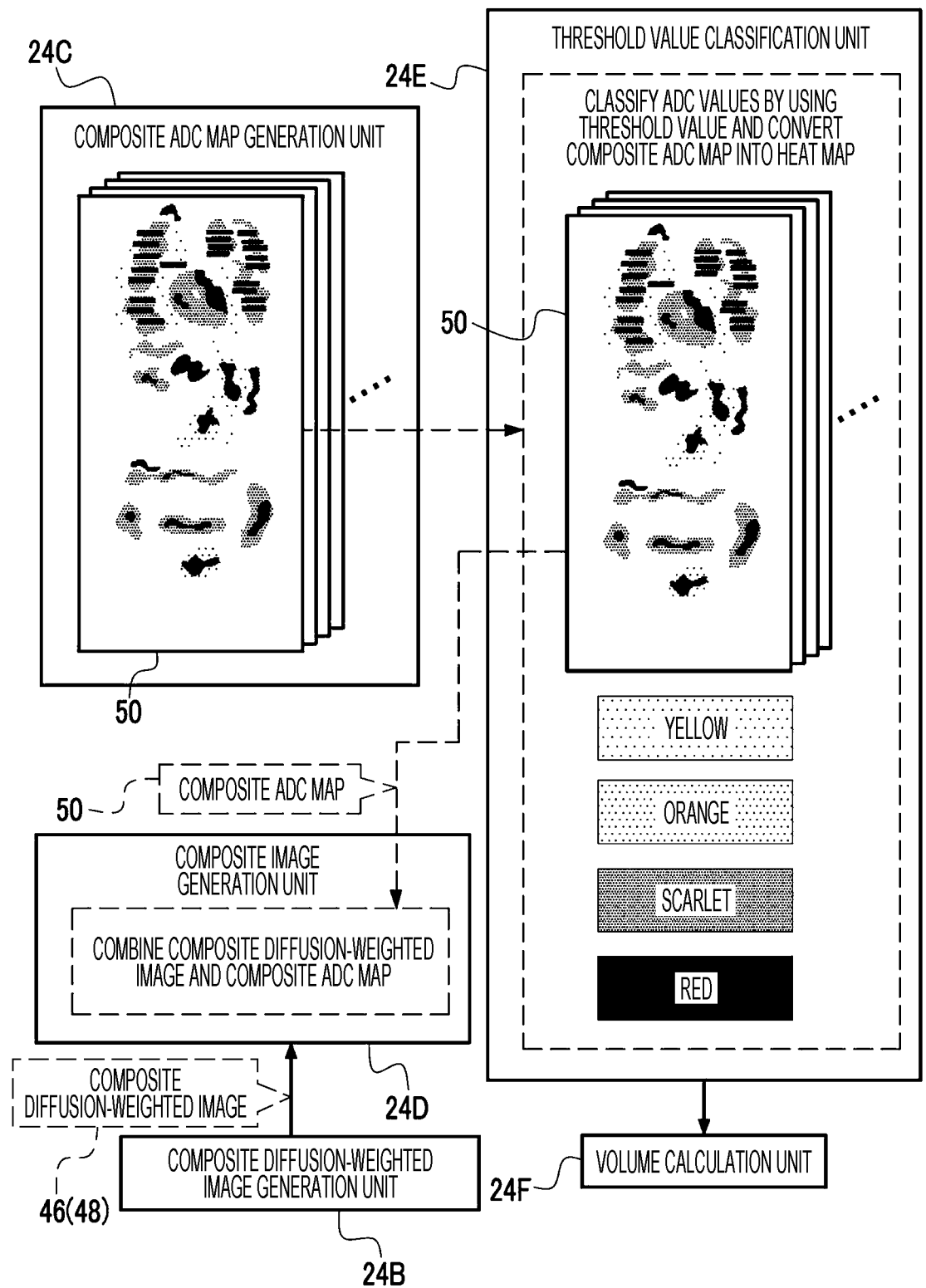
FIG. 12 is a conceptual diagram illustrating a modification of the processing performed by the threshold value classification unit and the composite image generation unit.

In this case, as an example, as illustrated in FIG. 12, the threshold value classification unit 24E acquires a composite ADC map 50 generated by the composite ADC map generation unit 24C. Further, the threshold value classification unit 24E classifies the signal values in the acquired composite ADC map 50 by using the first to fourth threshold values and assigns colors corresponding to threshold value ranges to the pixels in the composite ADC map 50. Thereafter, as in the description of the embodiment described above, the volume calculation unit 24F calculates the first to fourth real-space volumes and the total volume. Further, the composite image generation unit 24D combines a designated composite diffusion-weighted image among the first composite diffusion-weighted image 46 and the second composite diffusion-weighted image 48 with the composite ADC map 50 having pixels assigned the colors corresponding to threshold value ranges to generate a composite image 52. Also in this case, effects similar to those of the embodiment described above are achieved.

(2) Further, the medical operation support apparatus 10 according to the embodiment described above does not evaluate the state of a site on the basis of a result of classifying signal values in the composite ADC map 50 by using a threshold value. However, the technology of the present disclosure is not limited to this. Specifically, the medical operation support apparatus 10 may be configured such that the processor 24 evaluates the state of a site on the basis of a result of classifying signal values in the composite ADC map 50 by using a threshold value. In this case, for example, the processor 24 evaluates the state of a site on the basis of a result of classifying the signal values in the composite ADC map 50 by using the first to fourth threshold values, and the evaluation result is displayed on the display 16. That is, the processor 24 evaluates the state of a site in accordance with the composite ADC map which converted into a heat map, and causes the display 16 to display the evaluation result.

Figure 13:
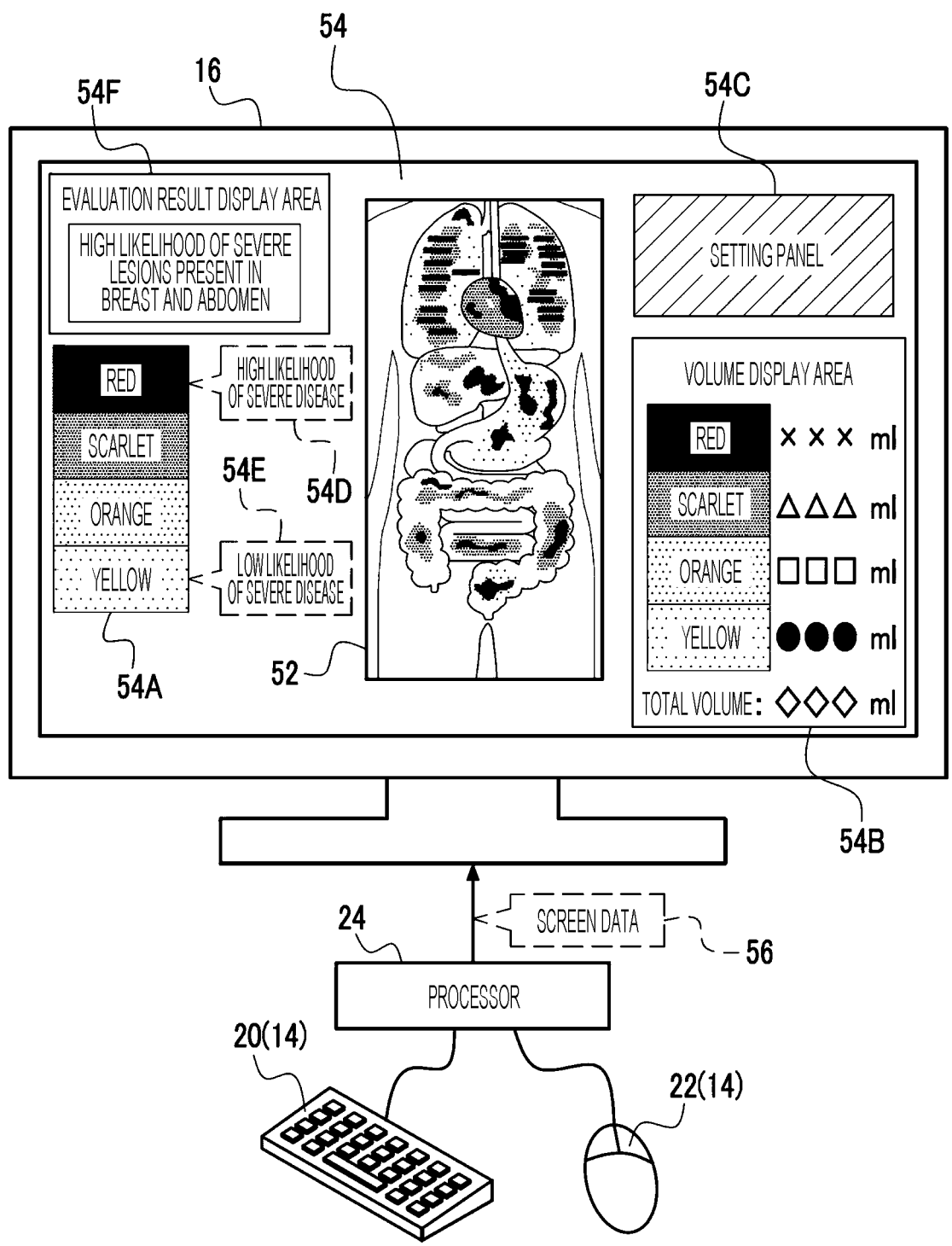
FIG. 13 is a conceptual diagram illustrating a modification of a form of a screen displayed on the display.

An example is illustrated in FIG. 13. A screen 54 is indicated by screen data 56 generated by the processor 24. The illustrated screen 54 includes a message 54D, a message 54E, and an evaluation result display area 54F, unlike the screen 54 (see FIG. 10) described in the embodiment described above. The message 54D is a message indicating a high likelihood of a severe disease. For example, the message 54D indicates that the stage of the malignant tumor is the highest. The message 54D is associated with a red region in the legend 54A. The message 54E is a message indicating a low likelihood of a severe disease, and is associated with a yellow region in the legend 54A. In the evaluation result display area 54F, an evaluation result of the state of a site is displayed in a message format. As described above, the state of a site is evaluated by the processor 24 on the basis of the composite ADC map 50, which is converted into a heat map. In the example illustrated in FIG. 13, the evaluation result display area 54F displays a message indicating a high likelihood of severe lesions present in the breast and the abdomen.

In this case, for example, the processor 24 evaluates that the likelihood of a severe disease is high when the volume of the red region is greater than or equal to a reference value. Then, the processor 24 outputs to the display 16 the screen data 56 including information indicating the name of the site evaluated as having a high likelihood of a severe disease. In the evaluation result display area 54F of the display 16, accordingly, the state of the site evaluated as having a high likelihood of a severe disease is displayed in a message format. Accordingly, this configuration enables the user 18 to grasp the result of the evaluation of the state of a site by the processor 24.

(3) Further, the embodiment described above describes an example in which the composite ADC map 50 is generated after a composite diffusion-weighted image is generated (see steps ST22 and ST24 in FIG. 11). However, the technology of the present disclosure is not limited to this embodiment. That is, a composite diffusion-weighted image may be generated after the composite ADC map 50 is generated.

Figure 14:
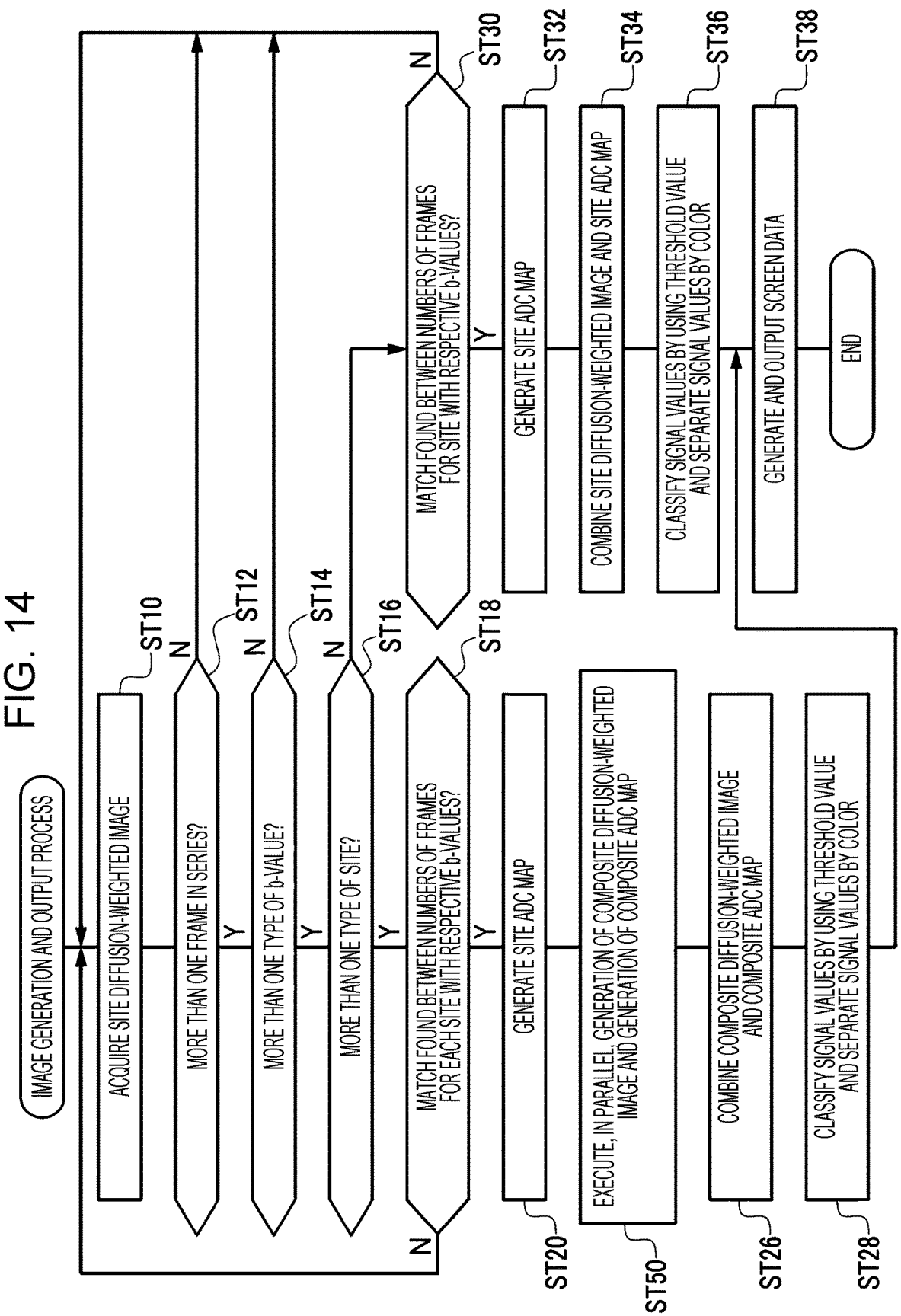
FIG. 14 is a flowchart illustrating a modification of the flow of the image generation and output process.

(4) Further, the embodiment described above describes an example in which, as illustrated in FIG. 11, a composite diffusion-weighted image is generated for each b-value (step ST22) and then a composite ADC map is generated (step ST24). However, as illustrated in FIG. 14, the processing of step ST50 may be performed instead of steps ST22 and ST24. In step ST50, the processor 24 performs, in parallel, the generation of a composite diffusion-weighted image for each b-value and the generation of the composite ADC map 50. As described above, the composite diffusion-weighted image for each b-value means the first composite diffusion-weighted image 46 and the second composite diffusion-weighted image 48.

Accordingly, this configuration makes it possible to contribute to a reduction in the time taken to obtain the composite image 52, as compared to a case where one of the generation of the composite diffusion-weighted images and the generation of the composite ADC map 50 is completed and then the other generation operation is performed.

(5) In the embodiment described above, "0" and "1000" are presented as an example of the b-values. However, the b-values may be three or more different b-values from which ADC values can be calculated. For example, the b-values may be "0", "1000", and "2000". When three or more b-values are used, one ADC map may be generated from site diffusion-weighted images with the three or more b-values, or a plurality of ADC maps may be generated from site diffusion-weighted images with the three or more b-values. For example, ADC maps using site diffusion-weighted images with the b-values "0" and "1000", the b-values "1000" and "2000", and the b-values "0" and "2000" may be generated as a plurality of ADC maps.

(6) In the embodiment described above, the breast, the abdomen, and the waist are illustrated as an example of a plurality of sites. However, the plurality of sites are not limited to these. The user may be able to select a plurality of sites, as desired, as long as, for example, a plurality of sites are selected from among the head, the breast, the abdomen, the waist, the legs, and the like. Alternatively, one site selected from among the head, the breast, the abdomen, the waist, the legs, and the like may be divided to obtain a plurality of segment sites (for example, the breast may be divided into parts from the head side to the abdominal side to obtain segment sites).

(7) Further, the embodiment described above describes an example in which the processor 24 of the image processing apparatus 12 included in the medical operation support apparatus 10 performs an image generation and output process. However, the technology of the present disclosure is not limited to this, and a device that performs the image generation and output process may be disposed outside the medical operation support apparatus 10.

Figure 15:
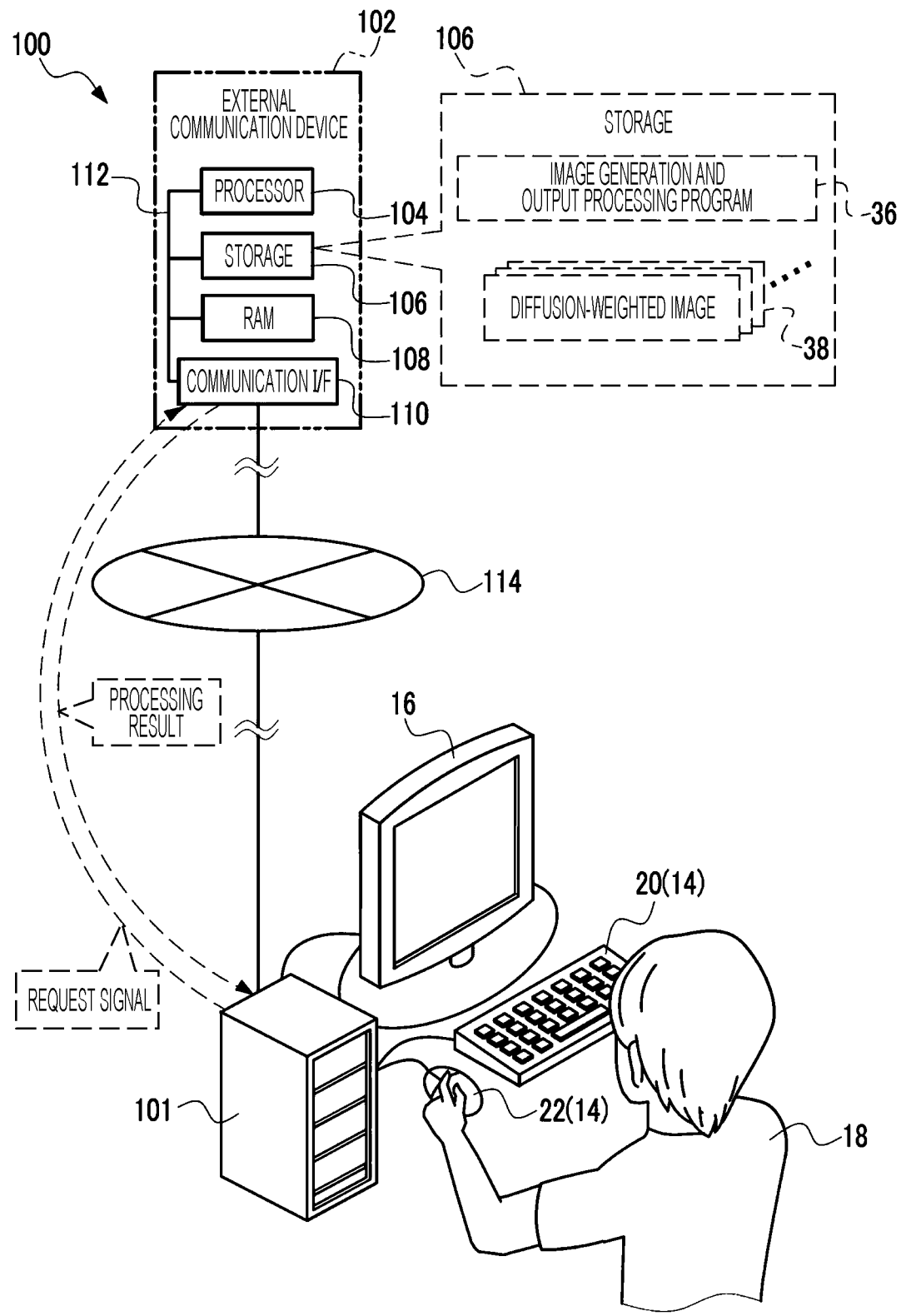
FIG. 15 is a conceptual diagram illustrating a schematic configuration of a medical operation support system.

In this case, as an example, as illustrated in FIG. 15, a medical operation support system 100 can be employed. The medical operation support system 100 includes an information processing apparatus 101 and an external communication device 102. The information processing apparatus 101 is an apparatus obtained by removing the image generation and output processing program 36 and the series of diffusion-weighted images 38 from the storage 26 of the image processing apparatus 12 described in the embodiment described above. The external communication device 102 is, for example, a server. The server is implemented by, for example, a mainframe. The server may be implemented by cloud computing, or may be implemented by network computing such as fog computing, edge computing, or grid computing. While a server is given as an example of the external communication device 102, at least one personal computer or the like may be used as the external communication device 102 in place of the server.

The external communication device 102 includes a processor 104, a storage 106, a RAM 108, and a communication I/F 110. The processor 104, the storage 106, the RAM 108, and the communication I/F 110 are connected to each other by a bus 112. The communication I/F 110 is connected to the information processing apparatus 101 via a network 114. The network 114 is, for example, the Internet. The network 114 is not limited to the Internet, and may be a WAN and/or a LAN such as an intranet.

The storage 106 stores the image generation and output processing program 36 and the plurality of diffusion-weighted images 38. The processor 104 executes the image generation and output processing program 36 on the RAM 108. The processor 104 performs the image generation and output process described above in accordance with the image generation and output processing program 36 executed on the RAM 108.

The information processing apparatus 101 transmits a request signal to the external communication device 102 to request execution of the image generation and output process. The communication I/F 110 of the external communication device 102 receives the request signal via the network 114. The processor 104 performs the image generation and output process in accordance with the image generation and output processing program 36, and transmits a processing result to the information processing apparatus 101 via the communication OF 110. The information processing apparatus 101 receives the processing result (for example, the screen data 56) transmitted from the external communication device 102 through the communication OF 30 (see FIG. 2), and outputs the received processing result to various devices such as the display 16.

In the example illustrated in FIG. 15, the external communication device 102 is an example of an "image processing apparatus" according to the technology of the present disclosure, and the processor 104 is an example of a "processor" according to the technology of the present disclosure.

(8) The image generation and output process may be performed in a distributed manner by a plurality of devices including the information processing apparatus 101 and the external communication device 102.

(9) Further, the embodiment described above describes an example in which the processor 24 is implemented by a CPU and a GPU. However, the technology of the present disclosure is not limited to this. For example, the processor 24 may be a processor implemented by at least one of a CPU, a GPU, a GPGPU (General-purpose computing on graphics processing units), or a TPU (Tensor processing unit).

Figure 16:
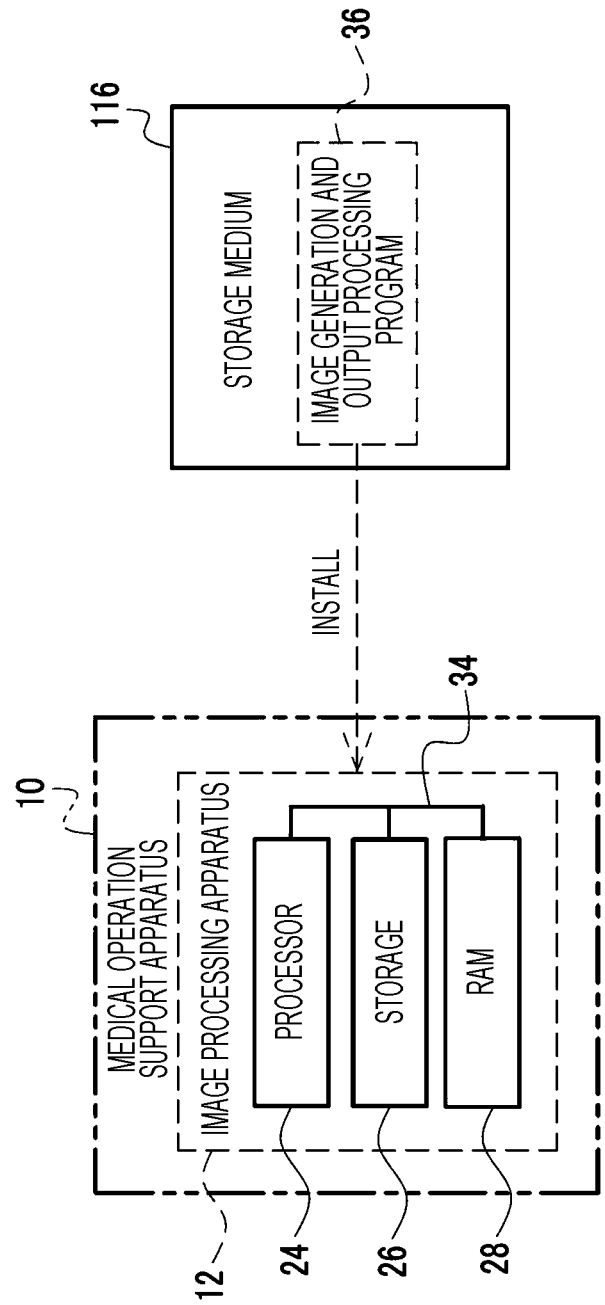
FIG. 16 is a block diagram illustrating an example of a form in which an image generation and output processing program stored in a storage medium is installed in the image processing apparatus.

(10) Further, the embodiment described above describes an example in which the image generation and output processing program 36 is stored in the storage 26. However, the technology of the present disclosure is not limited to this. For example, as illustrated in FIG. 16, the image generation and output processing program 36 may be stored in a storage medium 116 such as an SSD or a USB memory. The storage medium 116 is a portable non-transitory storage medium. The image generation and output processing program 36 stored in the storage medium 116 is installed in the image processing apparatus 12 of the medical operation support apparatus 10. The processor 24 executes the image generation and output process in accordance with the image generation and output processing program 36.

The image generation and output processing program 36 may be stored in a storage device of another computer, a server device, or the like. In response to a request from the medical operation support apparatus 10, the image generation and output processing program 36 may be downloaded from the storage device and installed in the image processing apparatus 12. At this time, the other computer, the server device, or the like is connected to the medical operation support apparatus 10 via a network (not illustrated).

Not all of the image generation and output processing program 36 need to be stored in a storage device of another computer, a server device, or the like connected to the medical operation support apparatus 10 or in the storage 26. Part of the image generation and output processing program 36 may be stored. The storage medium 116, a storage device of another computer, a server device, or the like connected to the medical operation support apparatus 10, and any other external storage (such as a database, for example) are placed as memories to be used while being directly or indirectly connected to the processor 24.

(11) Further, the embodiment described above describes an example in which the image processing apparatus 12 is exemplified as a computer. However, the technology of the present disclosure is not limited to this. Instead of a computer, a device including an ASIC (Application Specific Integrated Circuit), an FPGA (Field-Programmable Gate Array), and/or a PLD (Programmable Logic Device) may be applied. Alternatively, instead of a computer, a combination of a hardware configuration and a software configuration may be used.

(12) Examples of a hardware resource that executes the image generation and output process described in the embodiment described above may include various processors as follows. Examples of the processors include a CPU. The CPU is a general-purpose processor and executes software, that is, a program, to function as a hardware resource that executes the image generation and output process. Other examples of the processors include a dedicated electric circuit. The dedicated electric circuit is a processor having a circuit configuration designed specifically for executing specific processing. The dedicated electric circuit is, for example, an FPGA, a PLD, an ASIC, or the like. A memory is incorporated in or connected to each of the processors, and each of the processors executes the image generation and output process by using the memory.

The hardware resource that executes the image generation and output process may be constituted by one of the various processors or by a combination of two or more processors of the same type or different types. For example, a combination of a plurality of FPGAs or a combination of a CPU and an FPGA may be used. Alternatively, the hardware resource that executes the image generation and output process may be a single processor.

Examples of configuring the hardware resource as a single processor include, first, a form in which the processor is configured as a combination of one or more CPUs and software and the processor functions as a hardware resource that executes the image generation and output process. The examples include, second, a form in which, as typified by an SoC (System-on-a-chip) or the like, a processor is used in which the functions of the entire system including a plurality of hardware resources that execute the image generation and output process are implemented as one IC (Integrated Circuit) chip. As described above, the image generation and output process is implemented by using one or more of the various processors described above as hardware resources.

More specifically, the hardware configuration of these various processors may be an electric circuit in which circuit elements such as semiconductor elements are combined. The image generation and output process described above is merely an example. Thus, it goes without saying that unnecessary steps may be deleted, new steps may be added, or the processing order may be changed without departing from the gist.

(13) The foregoing description and illustrations of the drawings are merely examples of the technology of the present disclosure. For example, the description related to the configurations, functions, operations, and effects described above is merely an example of the configurations, functions, operations, and effects of portions related to the technology of the present disclosure. Thus, it goes without saying that unnecessary portions may be deleted from, new elements may be added to, or substituted for the details described above and illustrated in the drawings without departing from the gist of the technology of the present disclosure. In addition, to avoid complexity and facilitate understanding of portions related to the technology of the present disclosure, descriptions of common general technical knowledge and the like that do not particularly require description to implement the technology of the present disclosure are omitted from the foregoing description and the drawings.

As used herein, "A and/or B" is synonymous with "at least one of A or B". That is, "A and/or B" means only A, only B, or a combination of A and B. In this specification, furthermore, a concept similar to that of "A and/or B" is applied also to the expression of three or more matters in combination with "and/or".

All publications, patent applications, and technical standards mentioned herein are incorporated herein by reference to the same extent as if each individual publication, patent application, or technical standard was specifically and individually indicated to be incorporated by reference.

What is claimed is:

1. An image processing apparatus comprising a processor configured to:
acquire a site diffusion-weighted image for each of a plurality of sites;
derive an ADC value of each of the sites from a plurality of the site diffusion-weighted images;
combine the plurality of site diffusion-weighted images to generate a composite diffusion-weighted image;
combine the respective ADC values of the sites to generate an ADC image, wherein
generation of the composite diffusion-weighted image and generation of the ADC image are performed in parallel; and
combine the composite diffusion-weighted image and the ADC image to generate a composite image.

2. The image processing apparatus according to claim 1, wherein
the processor is configured to, after deriving the ADC value, generate the composite diffusion-weighted image and generate the ADC image.

3. The image processing apparatus according to claim 1, wherein
the processor is configured to acquire, for each of the plurality of sites, a plurality of the site diffusion-weighted images having different intensities of a gradient magnetic field during imaging, and
derive the ADC value for each of the plurality of sites on the basis of the plurality of site diffusion-weighted images having different intensities.

4. The image processing apparatus according to claim 1, wherein
the processor is configured to acquire the site diffusion-weighted images as a plurality of intensity-based site diffusion-weighted images having different intensities of a gradient magnetic field during imaging, and
the composite diffusion-weighted image to be combined with the ADC image is an image obtained by combining intensity-based site diffusion-weighted images designated for the plurality of sites from among the plurality of intensity-based site diffusion-weighted images.

5. The image processing apparatus according to claim 1, wherein
the processor is configured to classify signal values in the ADC image by using a threshold value.

6. The image processing apparatus according to claim 5, wherein
the processor is configured to evaluate a state of the sites on the basis of a result of classifying the signal values by using the threshold value.

7. The image processing apparatus according to claim 5, wherein
a plurality of the threshold values are set within a designated numerical range.

8. The image processing apparatus according to claim 7, wherein
the numerical range is variable.

9. The image processing apparatus according to claim 7, wherein
the number of threshold values set within the numerical range is variable.

10. The image processing apparatus according to claim 5, wherein
the processor is configured to output data for displaying a classification result image on a display, the classification result image indicating a result of classifying the signal values by using the threshold value.

11. An image processing method comprising:
acquiring a site diffusion-weighted image for each of a plurality of sites;
deriving an ADC value of each of the sites from a plurality of the site diffusion-weighted images;
combining the respective ADC values of the sites to generate an ADC image;
combining the plurality of site diffusion-weighted images to generate a composite diffusion-weighted image, wherein
generation of the composite diffusion-weighted image and generation of the ADC image are performed in parallel; and
combining the composite diffusion-weighted image and the ADC image to generate a composite image.

12. A non-transitory computer-readable storage medium storing a program executable by a computer to perform a process including:
acquiring a site diffusion-weighted image for each of a plurality of sites;
deriving an ADC value of each of the sites from a plurality of the site diffusion-weighted images;
combining the respective ADC values of the sites to generate an ADC image;
combining the plurality of site diffusion-weighted images to generate a composite diffusion-weighted image, wherein
generation of the composite diffusion-weighted image and generation of the ADC image are performed in parallel; and
combining the composite diffusion-weighted image and the ADC image to generate a composite image.

* * * * *